United States Patent [19]

McLaughlin et al.

[11] Patent Number: 4,678,040

[45] Date of Patent: * Jul. 7, 1987

[54] METHODS AND APPARATUS FOR RECOVERY OF HYDROCARBONS AND OTHER LIQUIDS FROM UNDERGROUND

[75] Inventors: Wayne C. McLaughlin, St. Charles; William J. Recker, Bloomingdale; Phillip C. Modesitt, Chicago; Paul K. Francescon, Coal Valley, all of Ill.

[73] Assignee: Pump Engineer Associates, Inc., Addison, Ill.

[ * ] Notice: The portion of the term of this patent subsequent to Jul. 9, 2002 has been disclaimed.

[21] Appl. No.: 804,265

[22] Filed: Dec. 3, 1985

Related U.S. Application Data

[63] Continuation-in-part of Ser. No. 691,166, Jan. 14, 1985, Pat. No. 4,625,801, which is a continuation-in-part of Ser. No. 513,264, Jul. 13, 1983, Pat. No. 4,527,633.

[30] Foreign Application Priority Data

Jul. 4, 1984 [CA] Canada .................................. 458105

[51] Int. Cl.⁴ ...................... E21B 43/12; E21B 44/16; F04F 1/08
[52] U.S. Cl. ...................................... 166/370; 166/53; 166/64; 166/372; 210/416.5; 210/800; 417/118; 417/147
[58] Field of Search .................... 166/53, 64, 369, 370, 166/372; 210/800, 138, 119, 121, 416.5; 417/118, 122, 137, 147

[56] References Cited

U.S. PATENT DOCUMENTS

| 129,353 | 7/1882 | Lytle . | |
|---|---|---|---|
| 751,323 | 2/1904 | Moran et al. . | |
| 801,981 | 10/1905 | Gosse | 417/118 |
| 964,693 | 7/1910 | Richardson | 417/118 |
| 2,580,332 | 12/1951 | Teetor | 166/64 |
| 3,617,152 | 11/1971 | Cummings | 417/147 |
| 3,647,319 | 3/1972 | McLean et al. | 417/143 |
| 3,894,583 | 7/1975 | Morgan | 166/68 |
| 3,931,831 | 1/1976 | French | 137/525 |
| 3,991,825 | 4/1976 | Morgan | 166/68 |
| 4,025,237 | 5/1977 | French | 417/147 X |
| 4,187,912 | 2/1980 | Cramer | 166/53 X |
| 4,252,649 | 2/1981 | Favret, Jr. | 210/800 |
| 4,295,975 | 10/1981 | Walin | 210/800 |
| 4,527,633 | 7/1985 | McLaughlin et al. | 166/370 |
| 4,546,830 | 10/1985 | McLaughlin et al. | 166/370 |

FOREIGN PATENT DOCUMENTS 1367088 11/1964 France .................................. 417/118

*Primary Examiner*—George A. Suchfield
*Attorney, Agent, or Firm*—Mann, McWilliams, Zummer & Sweeney

[57] ABSTRACT

Methods and apparatus for the recovery of petroleum origin hydrocarbons and other liquids from underground at sites of refineries, oil, gasoline and other liquid storage and distributing facilities, tie creasoting plants, and the like. Pursuant to the invention, for petroleum origin hydrocarbon recovery, separate liquid handling devices, each in the nature of a vessel or canister and having liquid trapping and ejecting facilities that are free of mechanical pumping action, are employed for raising the ground water and liquid hydrocarbons that accumulate on the ground water table, respectively, through which the well or wells extend, and under the static pressure of the compressed air. The indicated devices are suspended in the same or adjacent wells that are located at the site, with the ground water handling device being connected to a soure of compressed air and piping for carrying away the water to form a cone of depression at the site, and the hydrocarbon handling device being connected to the source of compressed air and a recovery line for separately surfacing and conveying the hydrocarbons to a point of collection and recovery. The invention also provides for use of one of the vessels and associated equipment to pump both liquids from the well to the ground surface for separation of same by a conventional separator, or alternately, recovery of heavier than water liquids.

9 Claims, 15 Drawing Figures

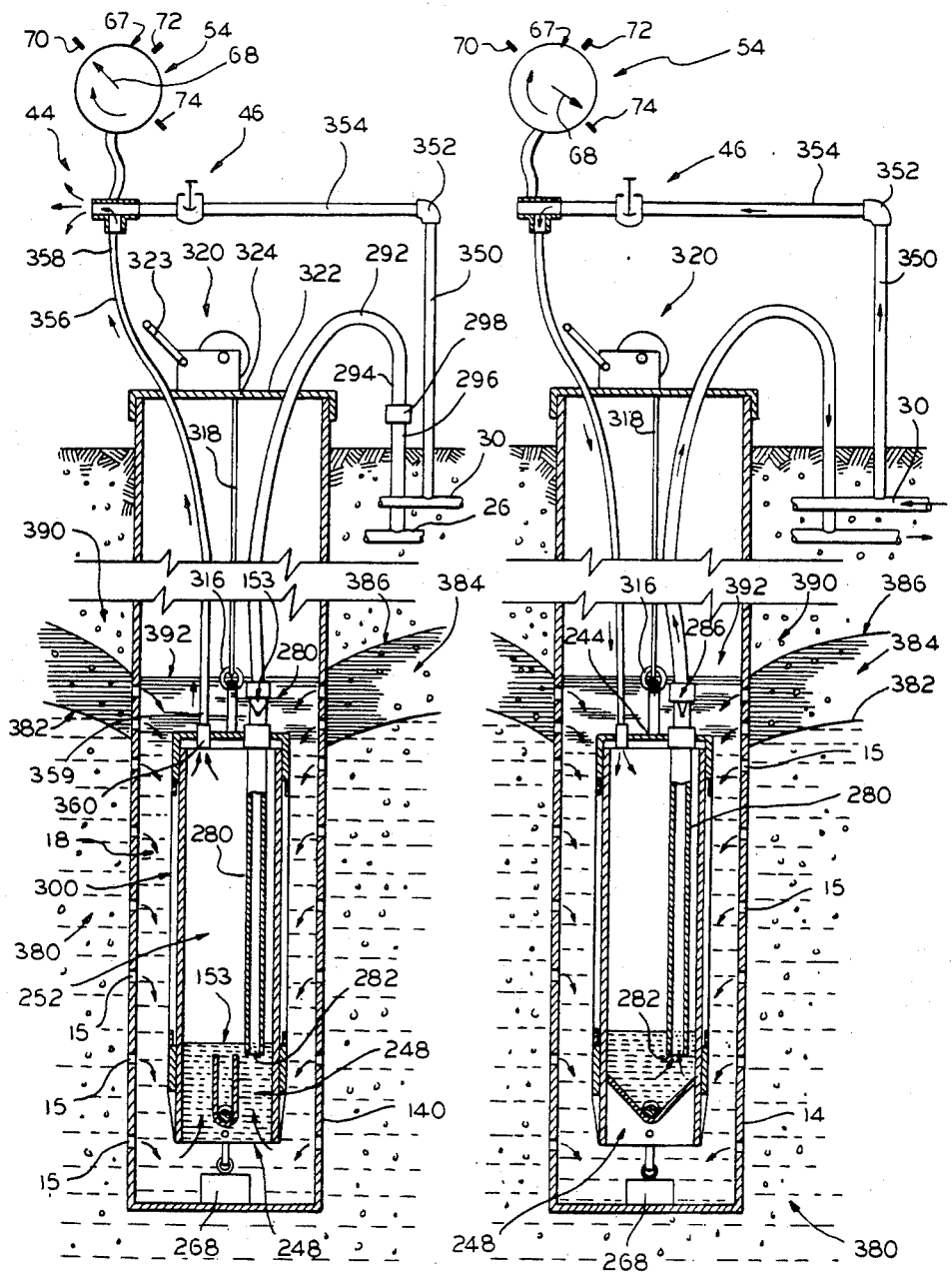

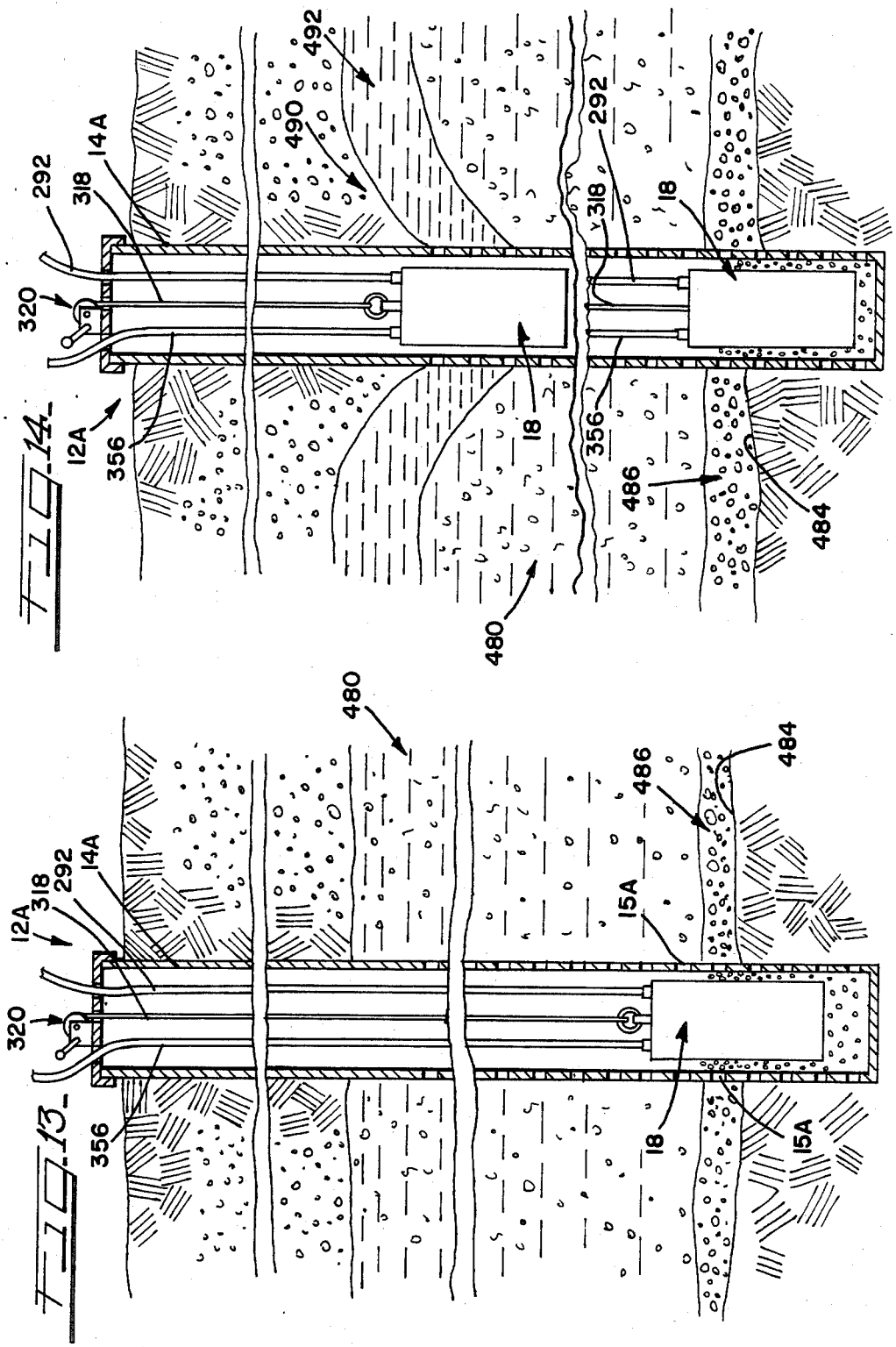

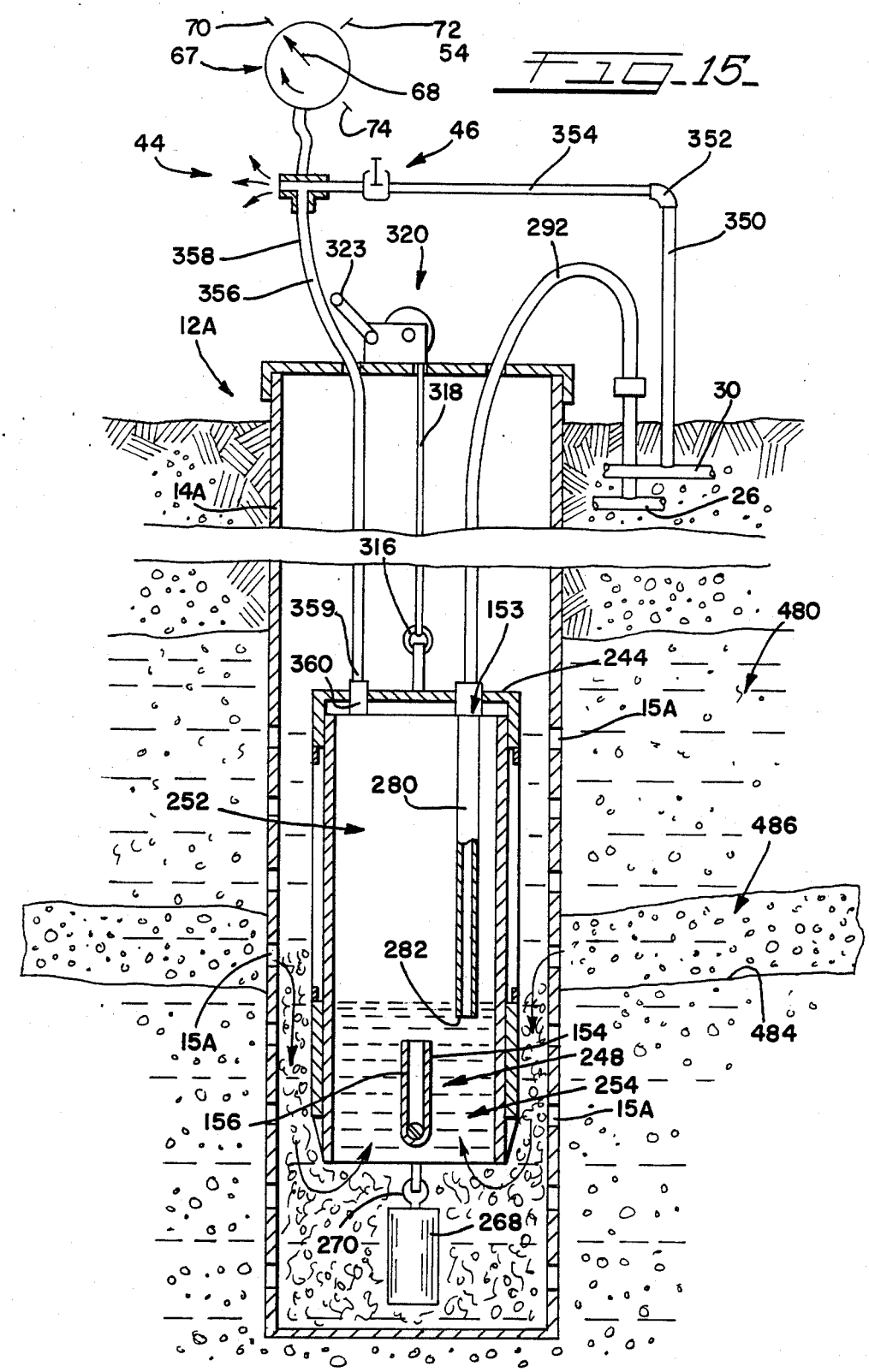

METHODS AND APPARATUS FOR RECOVERY OF HYDROCARBONS AND OTHER LIQUIDS FROM UNDERGROUND

This application is a continuation-in-part of our application Ser. No. 691,166, filed Jan. 14, 1985, now U.S. Pat. No. 4,625,801, granted Dec. 2, 1986, which is a continuation-in-part of our application Ser. No. 513,264, filed Jul. 13, 1983, now U.S. Pat. No. 4,527,633, granted Jul. 9, 1986, the disclosure of which was the subject of our divisional patent application Ser. No. 684,274, filed Dec. 20, 1984, now U.S. Pat. No. 4,546,830, granted Oct. 15, 1985.

The present invention is directed to methods and apparatus for recovery of hydrocarbons and other liquids from or below underground water tables, for both decontamination purposes and providing a commercially usable byproduct as a result of the decontamination, and more particularly, to, for instance, recovery of petroleum origin hydrocarbon liquids that have collected underground on the water table at the sites of refineries and other oil and gas storage and/or dispersement and/or handling, piping or the like, facilities, where, due to spillage and the like, the petroleum origin hydrocarbons in liquid form have gone underground in quantities sufficient to warrant purging of the ground water table of same and have as a byproduct of the removal operation adequate quantities of the hydrocarbons for processing as needed to provide a commercially appealing end product. The invention is also concerned with recovery of liquids that similarly collect below water tables.

It is well known that at refineries and other facilities where petroleum products are processed and handled, substantial quantities of the petroleum origin liquids involved (hereinafter some times referred to for convenience of reference and description as petroleum origin hydrocarbons or "hydrocarbons"), are lost into the ground due to spillage and the like. Over a period of time the hydrocarbons involved tend to seep down into the ground to the ground water table level, and collect there. As such liquid hydrocarbons have a specific gravity that is less than that of water, and they are, generally speaking, immiscible with water, they form their own liquid table level on top of the ground water table. While there may be some admixing of the two discrete types of liquids as the ground water table rises and falls over a period of time, the liquid hydrocarbons that are under ground tend to remain a separate and distinct liquid strata on top of the ground water table having water table characteristics that are similar to those of the ground water table.

Heretofore such hydrocarbons have been recovered from wells formed at these locations and extending well down into the water table, by pumping the ground water from the well and piping it to a ground level point of disposal that is remote from the well, to create a so-called cone of depression in the ground water table adjacent the well, with the result that the liquid hydrocarbons there located tend to flow under gravity toward the center of the cone of depression and collects there. The ground water removed to form the cone of depression, known as draw down water, is conveyed to a disposal or storage site sufficiently remote from the well to avoid the water flowing right back into the cone of depression that has been created in the ground water table to in effect serve as a collection basin for the hydrocarbons to be recovered.

Apparatus employed for the purpose of recovery of underground hydrocarbons at sites of the type indicated have heretofore involved mechanical pumping arrangements of the centrifugal and other common mechanical pump types that are suspended in the well in the hydrocarbons and operated to pump the hydrocarbons from the well to ground level. These prior art approaches have involved a number of problems that in the past have made it difficult to recover these hydrocarbons, in quantities adequate in quantity and quality to warrant commercial exploitation of same, and consequently limited incentives to try to decontaminate the ground water table at sites of the type indicated.

For instance, one currently practiced approach is to deliver the recovered hydrocarbon liquids through a filter that tends to plug up all too readily. Further, mechanical pumps that are employed are ordinarily electrically driven, and since hydrocarbons are highly inflamable, fire danger is an ever present problem. Also, as the hydrocarbons involved are removed, the pumping speeds have to be changed to be commensurate with the hydrocarbons remaining to be recovered, which requires expensive variable speed drives for the pump equipment involved.

As to the ground water removed to form the indicated cone of depression, it is important that the draw down involved be as little as possible since once the ground is contaminated with hydrocarbons, it will retain some of the hydrocarbons even after the bulk of same have been removed. Thus, where centrifugal and other mechanical types of water pump equipment are involved for draw down purposes, some type of level sensing device and expensive variable speed controls would be required in order for the equipment to operate properly, and as draw down pumps are usually suspended near the bottom of the well, a substantial amount of debris will be passing through the pump with resulting high pump maintenance requirements.

A principal object of the present invention is to provide methods and apparatus for recovery of petroleum origin hydrocarbons from ground water tables, that employs as the prime mover for the equipment involved compressed air, with the removal of both the draw down water and the hydrocarbons being separately effected, and with the liquid removed being effected by a system of valving and controls that effects a trapping of a quantity of the liquids involved, and compressed air ejection of same to the ground level, which system is on a time sequence basis that is readily adjustable, without requiring expensive variable speed drives or level sensing devices, to change performance as needed to meet changing well conditions.

Another principal object of the invention is to provide methods and apparatus for draw down removal of the ground water at the hydrocarbon recovery site, that insures that only water will be removed in effecting formation of the indicated cone of depression in the ground water table, and that minimizes moving parts and simplifies operation for trouble free removal of the water that is involved.

Yet another principal object of the invention is to provide methods and apparatus for removal of the hydrocarbons from ground water tables, and in particular from a cone of depression that has been formed in same for this purpose, which insures that only the hydrocarbon or a maximized concentration of same are brought from the well and conveyed therefrom for suitable treatment to provide the desired product reward for in effect decontaminating the ground water table involved.

Still other important objects of the invention are to provide methods and apparatus for recovering the hydrocarbons from ground water tables at sites where hydrocarbons collect underground in which the moving parts of the apparatus that are exposed to liquids involved are limited to check valve type flow controls, the presence of electrical controls and motors in the recovery wells is avoided, compressed air is the prime mover for effecting liquid removal from the well and forced flow of same to points of collection or disposal, mixing of the unlike liquids involved together or with air is avoided, simple time cycle controls are provided that may be readily changed at the ground surface to meet changing well conditions, and the hydrocarbon liquids removed are at maximum hydrocarbon concentration levels for ready treatment as needed to provide a commercially attractive product.

Yet other objects of the invention are to provide methods and apparatus for removal of hydrocarbons from ground water tables adjacent refineries and the like in which the liquid removing devices involved for both the draw down and hydrocarbon recovery functions, are similar but separate and distinct, that may be made from standard off the shelf components in sizes needed for particular well applications, that may alternatively be separately employed to pump both liquids from the well for conveyance to conventional separation equipment, or recover heavier than water liquids that lie below ground water, and that are economical of manufacture, readily adapted for a wide variety of well type and other similar applications, and that are essentially maintenance free, and long lived and effective in operation.

In accordance with the invention of said application Ser. No. 513,264, methods and apparatus are provided for, for instance, the recovery of petroleum origin liquid hydrocarbons (which are normally lighter than water) from ground water tables at sites of refineries, oil and gasoline storage and dispersing facilities, and the like, in which the invention is practiced in association with a well or wells that exist or are driven or formed at the site involved, which wells extend well into the ground water table at the site.

Pursuant to the invention, a basic type of liquid trapping and ejecting liquid arrangement is provided for removing the ground water and recovering other liquids, with the device employed for the ground water removal for draw down purposes being specifically devised to take in the water adjacent the lower end of same, and be disposed low enough to the well bottom to insure that only ground water is removed by the draw down procedure; the same device may be employed to recover heavier than water liquids. The device for retrieving the lighter than water liquid hydrocarbons, on the other hand, is equipped to have its intake porting located closely adjacent the top level of the liquid hydrocarbons so that only the liquid hydrocarbons, or a maximized concentration of same, are allowed to enter the hydrocarbons recovery device. The separate draw down and hydrocarbon liquid recovery devices are suspended in the same or adjacent wells at the site involved, with the draw down device being connected to a source of compressed air and ground surface level located piping for carrying away the water to a remotely located desired point of disposal, and the hydrocarbon removing device is connected to the same or different source of compressed air and a ground level located recovery line for separately conveying the liquid hydrocarbons to the desired point of storage for later recovery processing, such as a tank or the like. The respective devices have check valve fluid directional flow controls, solenoid actuated air supply and venting controls, and operation timing mechanisms, whereby the draw down device is operated in the timed sequence required to create a cone of depression in the ground water table, so that the hydrocarbons lying on the ground water table tend to run or drain under gravity into the cone of depression which is centered on the well in which the draw down device is located; the hydrocarbon removal device removes the hydrocarbons with minimumized admixing with ground water and/or air, and supplies the removed hydrocarbons to the recovery line therefor, for conveyance to a suitable storage tank or the like to await recovery processing as needed.

At any one site, one or more draw down devices may be employed and one or more hydrocarbon recovery devices may be employed. Both types of devices may be suspended in the same well, and in one embodiment, the separate devices are integrally united in a composite unit for that purpose. On the other hand, a draw down device may be located in a well that is appropriately centered at the ground water table, and a number of the lighter than water hydrocarbon recovery devices may be separately and individually disposed in adjacent wells that are present or formed as needed, but close enough to the well having the draw down device to be within the draw down area defined by the draw down device. Alternately, the same basic type of liquid trapping and ejecting arrangement may be employed to pump both liquids, or recover heavier than water liquids that collect in the bottoms of deep wells formed for that purpose.

In accordance with one of the present inventions, the basic type of liquid trapping and ejecting liquid handling device is employed to remove both the lighter than water hydrocarbons and the ground water within a particular well, and while either the draw down device or the hydrocarbons recovery device referred to in said applications can be employed for this purpose, there is disclosed by the present application a device of this type which is basically similar to the draw down device but is formed to define at its upper end a liquid hydrocarbon inlet, which is communicated to the lower end of the device chamber by a conduit, with the modified device being open at its lower end, similar to the ground water device, to receive the ground water. As pumping of the liquids in the well to which the modified device is applied (termed in the disclosure "total liquids") proceeds, both the ground water and the lighter than liquid hydrocarbons flow into the modified device, and are jointly ejected therefrom, free of mechanical pumping of the liquids, using the check valve-compressed air ejection arrangement of said appliations.

In accordance with another of the present inventions, the draw down device and associated components and equipment related to same, the connections involved, and its manner of operation, are employed to recover underground liquids that are heavier than water and are to be found at the bottom of deep wells so formed for this purpose.

Other objects, uses, and advantages will become obvious or be apparent from a consideration of the following detailed description and the application drawings in which like reference numerals indicate like parts throughout the several views.

In the drawings:

FIGS. 1 and 2 are diagrammatic vertical sectional views through a well located at the site or locale of an oil refinery or the like where petroleum origin hydrocarbons in liquid form have accumulated underground and in association with the ground water table at that site, showing the ground water table being subjected to draw down shaping adjacent the well and indicating the layer or table of liquid hydrocarbons that is on top of same, with both being shown draining into the well through its casing, and illustrating in diagrammatic vertical section the hydrocarbon recovery vessel or canister that is suspended in the well and operated in accordance with the practice of the invention to recover the hydrocarbons, and the basic operating equipment associated therewith, which is shown largely diagrammatically, with the hydrocarbon recovery vessel in FIG. 1 being shown in its hydrocarbon intake phase, and the hydrocarbon recovery vessel in FIG. 2 being shown in its hydrocarbon discharging or ejecting phase;

FIGS. 3 and 4 are similar to FIGS. 1 and 2, respectively, but illustrate the ground water draw down vessel or canister and equipment associated therewith, with the draw down vessel of FIG. 3 being shown in its ground water intake phase and the draw down vessel in FIG. 4 being shown in its ground water discharge or ejection phase;

FIGS. 13 and 14 are diagrams illustrating the application of the invention for recovering underground located heavier than water liquids; and FIG. 15 is a view similar to those of FIGS. 3 and 4, showing in detail a similar equipment employed for the purposes indicated by FIGS. 13 and 14.

However, it is to be distinctly understood that the specific drawing illustrations provided are supplied primarily to comply with the Patent Laws, and that the invention is susceptible of modifications and variations that will be obvious to those skilled in the art, and which are intended to be covered by the appended claims.

GENERAL DESCRIPTION

Figure 10:
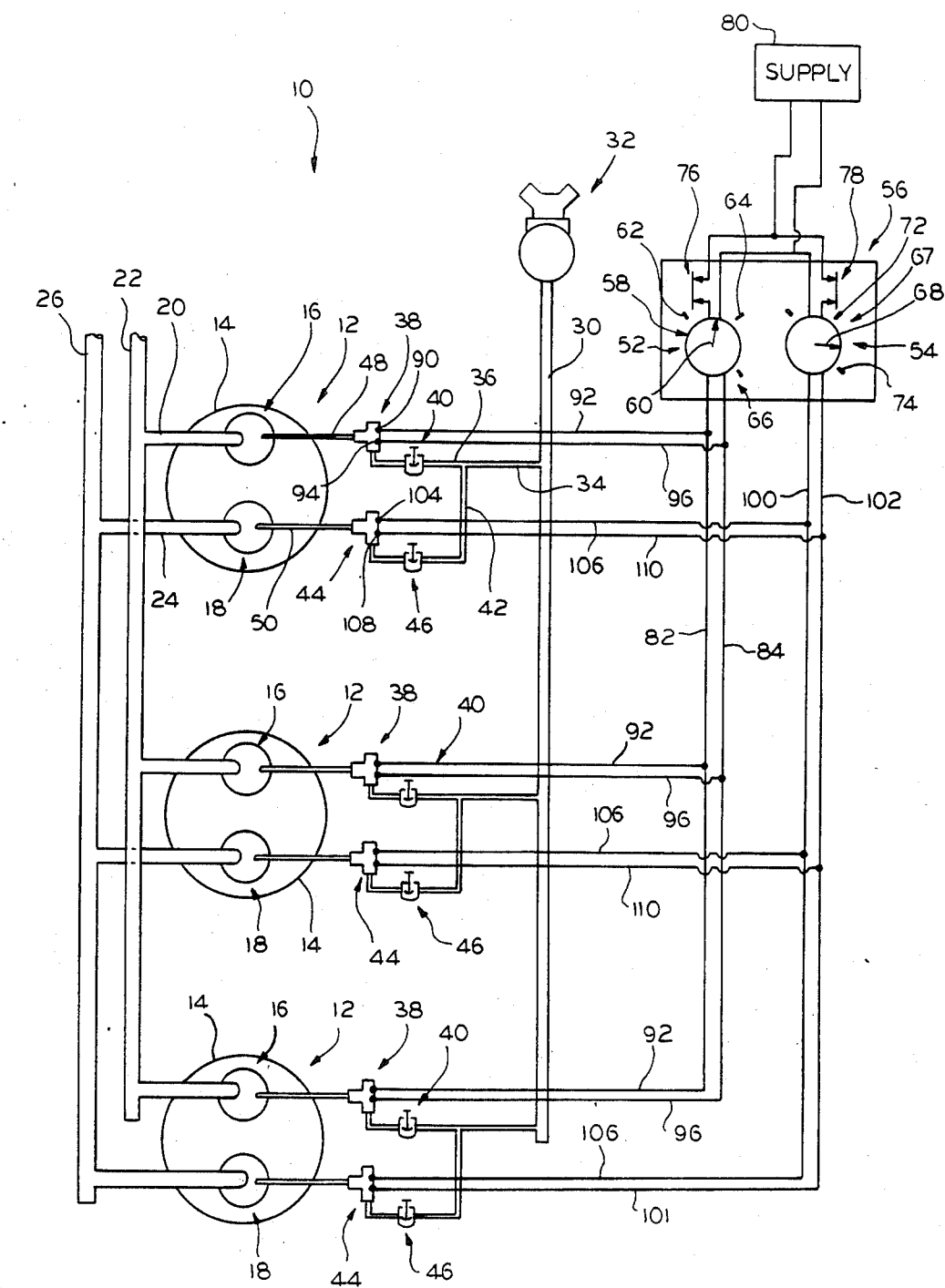
FIG. 10 is a diagrammatic and schematic view illustrating the principles of the invention incorporated in a three well system.

Reference numeral 10 of FIG. 10 generally indicates an illustration in accordance with the invention which services three adjacent wells 12 that are located at the site of an oil refinery or the like to recover the petroleum origin hydrocarbon liquids (that are lighter than water) that have accumulated adjacent the ground water table of the locale involved. The installation could be for a single well or a number of wells that would be suitable for recovery of the hydrocarbons involved and corresponding decontamination of the underlying ground water table. Installations made in accordance with the invention are effected after the property in question has been inspected and determination is made using conventional techniques to approximately locate the underground hydrocarbons involved and that over a period of time have accumulated at the level of the ground water table. The wells 12 may be existing for other purposes or they may be formed for purposes of practicing the present invention, and their number for any given installation, as well as the depth of the wells, the width of the wells, and the spacing of the wells will depend on such factors as the porosity of the soil, the nature of the soil at the sited involved, other geological considerations, existing wells that may present and are usable to practice the invention, and the specifications made by the property owner or his or its technical consultant.

While the wells 12 may be conventional in nature, generally speaking they should extend depthwise well below the upper level of the ground water table that is involved, and they should be lined by a suitable casing 14 which is suitably and conventionally perforated or apertured as at 15 (see FIGS. 1-4) so that the liquids in the ground can readily drain through the respective casings into the well.

In the specific installation 10 that is illustrated, each well 12 is provided with a hydrocarbon recovery vessel or canister 16 and a ground water draw down vessel or canister 18 which are arranged and suspended in operating position in one of the manners suggested in FIGS. 1 - 9, and 11 (which will be referred to more specifically hereinafter). In installations where the individual well casings are wide enough to receive both the vessels 16 and 18, this is what is preferred and is diagrammatically illustrated in FIG. 9. However, experience has shown that many installations will either have or will only permit relatively small diameter wells and casings therefor, and in such situations the respective vessels 16 and 18 will be applied to single adjacent well casings, in the manner suggested in FIGS. 1 and 2, and 3 and 4, respectively.

As diagrammatically illustrated in FIG. 10, the hydrocarbon recovery vessels 16 are connected by diagrammatically illustrated conduiting 20 to a recovery line or pipe 22 into which the recovered hydrocarbons are inserted, while the draw down vessels 18 are connected by diagrammatically illustrated conduiting 24 to a water pipe or header 26 into which the water is passed and conveyed from adjacent the wells 12 to a remote point of disposal or storage, as desired.

The respective vessels 16 and 18 are each connected to compressed air supply line or header 30 that originates at suitable air compressor 32. For purposes of illustration, FIG. 10 shows for each well 12 an auxiliary pipe 34 communicating between header 30 and branch conduit 36 for supplying compressed air to vessel 16 via suitable three way solenoid operated control valve 38, through suitable pressure regulator 40, while auxiliary line 34 also communicates with branch line 42 that supplies compressed air to vessel 18 via three way solenoid operated valve 44 through suitable pressure regulator 46. The respective solenoid operated valves 38 and 44 are connected to the respective conduits 48 and 50 that respectively lead to the respective vessels 16 and 18. The solenoid valves 38 and 44 for each well 12 are arranged to alternately communicate the interiors of the vessels 16 and 18 to atmosphere for venting for admission of the liquids to be received in each vessel, then shift to close off atmospheric venting of such vessels and admit to the interiors of same compressed air from header 30 to eject from the respective vessels the liquids that have accumulated in same, with the liquid directional flow controls involved for each vessel being check valve controlled by way of operation of the special check valves incorporated therein which are described specifically hereinafter, and, under the control of suitable conventional timers 52 and 54 that are diagrammatically illustrated and that may be suitably applied to control panel 56. Timer 52 is shown to comprise a suitable clock mechanism 58 having the usual sweep contact hand or arm 60 that moves thereabout under the control of the timing mechanism involved, between spaced contact indicators 62, 64 and 66 that are fully adjustable 360 degrees about the timing mechanism. Timer 54 may be similarly arranged and comprises suitable clock mechanism 67 equipped with suitable sweep hand or arm 68 serving as a switch arm that moves between contact indicators 70, 72 and 74 in a conventional manner. The timers 52 and 54 are respectively connected to the respective single pole off-on switches 76 and 78 to a suitable electrical supply 80 that may be of 110 volt capacity. The control panel 56 may be located immediately adjacent to a well 12, or at some remote location in a building adjacent the site in question, depending on the situation at the installation site.

The timer 52, when switches 76 and 78 are closed and the installation is operating, controls electrical energization and deenergization of electrical conduits 82 and 84, with conduit 82 being connected at each well 12 to contact 90 of the respective three way solenoids 38 by the respective connectors 92, while the conduit 82 is connected to the contact 94 of the same solenoid valves 38, respectively by connectors 96. Timer 54 controls the energization of electrical conduits 100 and 102 with the conduit 100 being connected to contact 104 of the respective solenoid valves 44 of each well by electrical connector 106, and the conduit 102 being connected to the contact 108 of the same solenoid valves 44, respectively, by connector 110.

The Liquid Handling Vessels

Figures 1, 2:
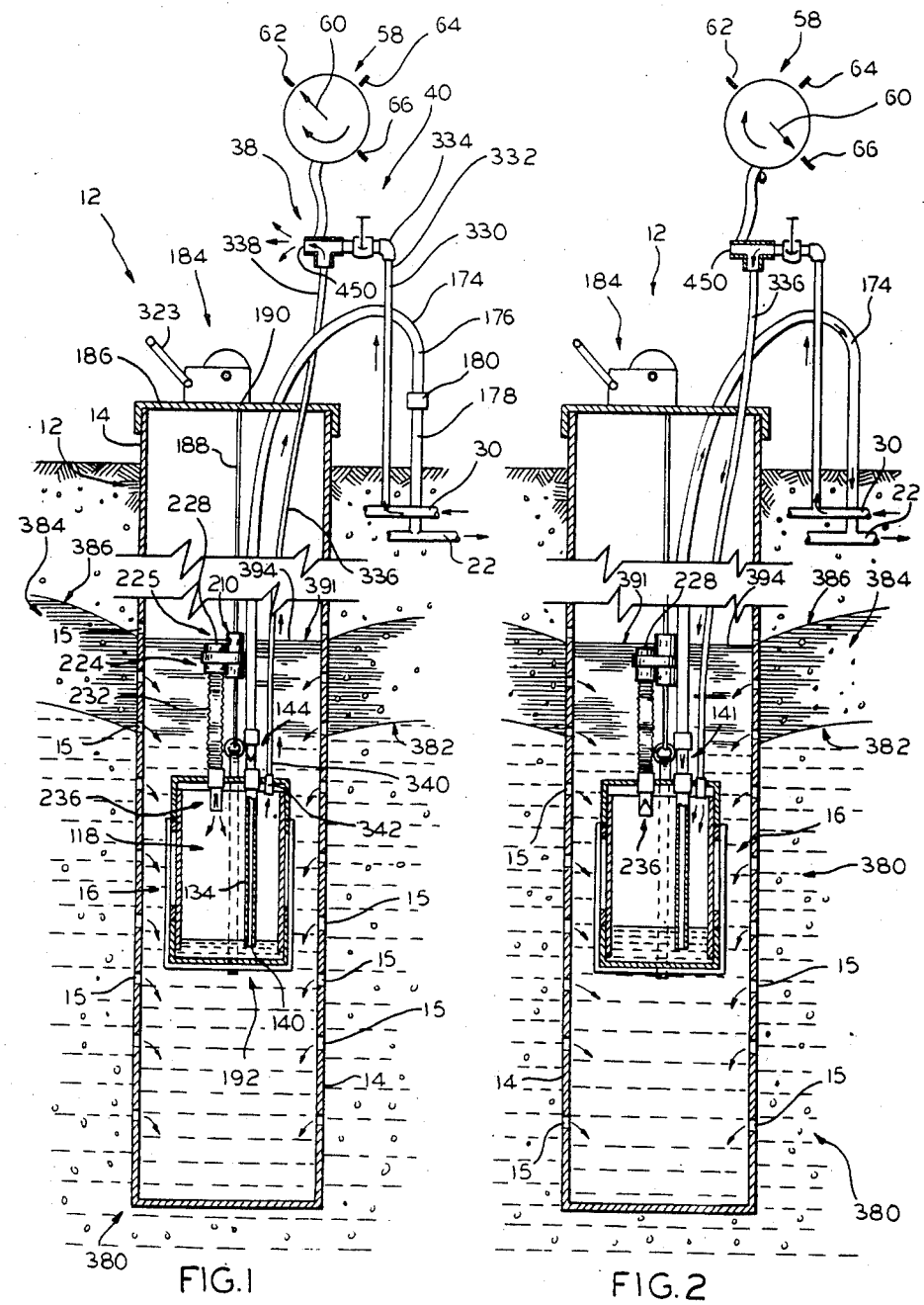
Figure 5:
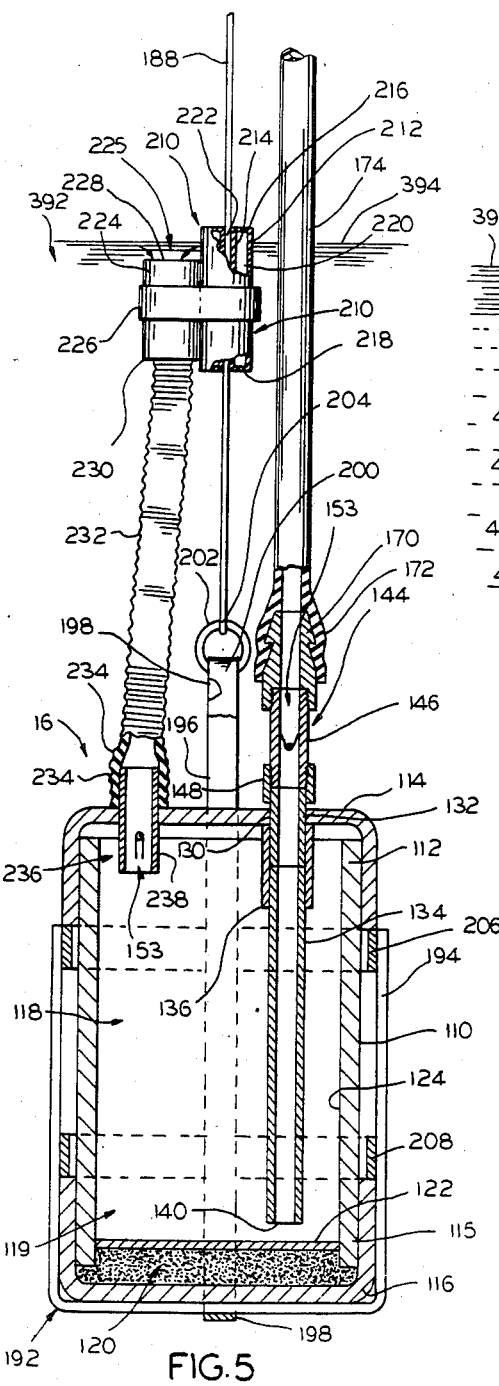
FIG. 5 is a diagrammatic vertical sectional view of the hydrocarbon recovery vessel on an enlarged scale, and partially in elevation, better illustrating the components parts of a typical embodiment of same, and illustrating one form of liquid hydrocarbon inflow port arrangement in accordance with the invention in the liquid well environment of FIGS. 1 and 2.

The hydrocarbons receiving and ejecting vessel or canister 16 is more specifically illustrated in the diagrammatic showings of FIGS. 1, 2 and 5 wherein it will be seen that the vessel 16 comprises sleeve 110 to the upper end 112 of which is fixed in sealed relation thereto the dished end cap 114, and to the lower end 115 of which is fixed in sealed relation thereto the dished end cap 116. The sleeve and its end caps 114 and 116 define the vessel chamber 118 which in accordance with the invention receives a quantity of the hydrocarbons to be recovered, and from which the received quantity of hydrocarbons is ejected and moved to recovery line 22.

The sleeve 110 and end caps 114 and 116 may conveniently be formed from a suitable plastic material, such as polyvinyl chloride (PVC schedule 40 or 80) and secured together by a suitable solvent bonding material that provides the leak free relation desired at all the joints between the respective caps and the sleeve 110. These components may also be formed from other suitable plastic materials, and might be formed from a suitable steel or other metal if so desired and joined by threading, welding, or flange bolting with suitable seals interposed therebetween as will be apparent to those skilled in the art.

At the lower end of the chamber 118 a quantity of ballast 120 is provided, which may be in the form of small stones, or gravel, but preferably is lead shot on top of which is applied separator plate 122 that is proportioned to be in close fitting relation to the internal surfacing 124 of sleeve 110 and be suitably bonded thereto to seal off the ballast from the remainder of the chamber 118. The ballast 120 as a whole preferably should have a weight of about twenty pounds, depending on the volume of chamber 118, experience has shown.

As indicated specifically in FIG. 5, the top end cap 114 of vessel 16 is apertured at 130 to receive tubular member 132 that inside the chamber 118 is abutted in congruent aligned relation to elongate tubular member 134 and affixed thereto by securing sleeve 136, with the tubular members 132 and 134 and sleeve 136 also being formed from one of the plastic materials indicated and these parts being suitably bonded together in leak free relation thereto, using suitable solvent bonding cement or the like.

Tubular member 134 extends down to adjacent the sleeve end 115, thus the lower end 119 of the chamber 118 to form or define the vessel chamber liquid outflow port 140. The sleeve 132, which is anchored in leak free relation with the cap 114, at its upper end is aligned with check valve device 144 that is of the type diagrammatically illustrated in FIG. 7, and which comprises sleeve member 146 that is in end to end relation with the sleeve 132 and affixed thereto in leak free relation thereto by a suitable collar 148, as by employing suitable bonding techniques screw threading or the like.

Figure 7:
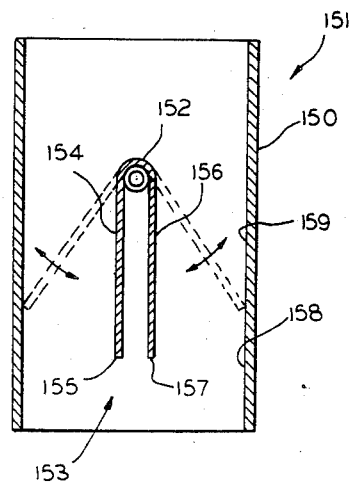
FIG. 7 is a fragmental transverse cross-sectional view on an enlarged scale diagrammatically illustrating the specific nature of the type of check valve that is employed in the liquid receiving and ejecting vessels or canisters of the invention.

The check valve device 144 is of a commercially available type 151 that is diagrammatically illustrated in FIG. 7 which comprises mounting sleeve 150 that has applied transversely of same in crosswise relation thereto pivot pin 152 on which are hinged a pair 153 of flapper valve plates 154 and 156 that are free to swing oppositely between the vertically disposed liquid flow passing positions of FIG. 7 (with liquid flow being in the direction of arrow 149) and the outwardly inclined dashed lines positions of FIG. 7 wherein they are in flow checking relation with the bore 158 defined by the valve device 151 (when the liquid flow direction is opposite that indicated by the arrow 149). The valve devices 151 are commercially available from Techno Corporation of Erie, Pa. and are known as the Technocheck Silent seatless check valve. Their flapper members 154 and 156 are contoured about their margins so that when they are in their outwardly inclined angled positions, due to the static pressure of the liquid flow that is directed toward the respective free ends 155 and 157 (that is, unpwardly in the showing of FIG. 7), they are in liquid flow checking relation with the bore 158 of the sleeve 150, and when the liquid flow is in the opposite direction, the static pressure of the liquid flow swings the flapper members 154 and 156 to the substantially parallel, flow passing relation shown in FIG. 7. Similarly, when there is no flow in either direction, the flapper members 154 and 156 take a similar substantially parallel position under the action of gravity, assuming the sleeve 150 in the position shown in FIG. 7 is vertically disposed or substantially so. Thus, the flapper members 154 and 156 are journalled on the hinge pin 152 for free swinging movement relative thereto, and they are free from spring biasing in either direction of movement. It is the direction of liquid flow past the flapper members 154 and 156 that positions them in either flow checking or free flow passing relation. The Technocheck silent seatless check valve arrangement that is diagrammatically illustrated by the showing of FIG. 7 is available in various sizes and materials and for connection to adjacent parts by bonding, screw threading, flange and bolt connections, or any other suitable manner, as neeeded or desired for a particular installation.

The basic check valve device 151 in application may be disposed as indicated in FIG. 4, with the flapper members 154 and 156 in depending relation, or may be disposed in the oppositely oriented vertically disposed relation, depending upon the application. Where the application calls for the liquid, the flow of which is controlled by the valve device 151, to be continuously within the valve sleeve bore 158, the valve device 151 may be other than vertically disposed, as, for instance, horizontally disposed, since the direction of the liquid flow will control the opening and closing of the flappers 154 and 156. The valve device 151 thus comprises a pair of oppositely acting and non-spring biased flapper members 154 and 156 mounted for full free swinging movement about a common pivot axis represented by cross pin 152, that extends crosswise of the direction of the liquid flow through the valve device in question. In the flow permitting mode of the check valve, the flapper members are in folded substantially parallel side by side relation in which liquid flow is permitted in the direction the flapper members extend from pin 152, while in the flow checking relation, the flapper members 154 are in the indicated oppositely angled relation wherein their margins are seated against the surface 159 of the sleeve that defines bore 158 with the margins of the flapper members 154 and 156 conventionally being configured for seal tight fit relation with the sleeve bore defining surfacing 159 in the commercially available embodiments of same.

Referring back now to FIG. 5, it will thus be seen that the check valve device 144 is in the form of check valve device 151 of FIG. 7, but disposed 180 degrees from the showing of FIG. 7. Suitably fixed, as by screw threading, to the upstanding end of the valve sleeve 146 is suitable nipple 170 over which one end 172 of flexible hose or piping 174 is affixed, as by employing the suitable force fitting relation indicated in FIG. 5, or any other suitable leak free connection such as that provided by the use of conventional hose clamps. The other end 176 of the flexible hose or piping 174 is suitably connected to stand pipe 178 that is suitably connected to and rises from the hydrocarbon collector conduit or piping 22; for this purpose, the flexible piping or hosing 174 may be provided with a conventional coupling 180 that has a familiar form of screw threaded and sealed connection to the upper end of stand pipe 178. It will thus be apparent that the flexible piping or hosing 174 and stand pipe 178 form the diagrammatically illustrated conduiting 20 of FIG. 10.

The vessel or canister 16 is adjustably supported within the well 12 to which it is applied, by suitable winch 184 (equipped with operating lever 185), that is appropriately mounted on top cover structure 186 of well casing 14, to which is operatively connected supporting cable 188 that extends through an aperture 190 formed in the cover structure and is connected to basket structure 192 in which the vessel or canister 16 is mounted. Cover structure 186 may be suitably locked or clamped in place on the casing, as by employing suitable hold down or clamping devices 454 that are diagrammatically illustrated in FIG. 9. The basket 192 may be of any suitable type, that illustrated comprising a pair of strappings 194 and 196 formed from suitable webbing or the like, stitched together as at 198 that forms the bottom of the basket and having the ends 198 and 200 of the strapping 196 suitably applied to ring 202 to which the lower end 204 of the cable 180 is suitably applied, as by having an "eye" formed in same for this purpose or some other conventional connector device being provided. The strappings 194 and 196 are connected by a pair of upper and lower transverse circumferential strappings 206 and 208, as by employing suitable stitching techniques so that the strappings 194 and 196 define the aforeindicated basket 192 in which vessel 16 is disposed for adjustable suspending in the well from winch 184.

Slidably mounted on the cable 180 is a tubular float member 210 that may be formed from a suitable plastic material or the like and defines integrally united outer and inner cylindrical side walls 212 and 214 and top and bottom end walls 216 and 218 which form an annular closed off chamber 220 in which air is trapped, and a bore 222 located along the axial center of same through which the cable 180 extends. Fixed to the outer side wall 212 of float member 210 is sleeve 224 that forms the hydrocarbon inlet 225 for vessel 16, with both the float 210 and sleeve 224 being formed, for instance, of suitable plastic materials and fixed together by a plastic strapping 226 wrapped thereabout and bonded thereto employing a suitable bonding cement or the like or alternately employing a suitable conventional hose clamp for this purpose. The upper end 228 of the sleeve 224 is preferably disposed well below the top end 216 of the float member 210, for reasons that will be made clear hereinafter, and is in the nature of a wier that defines inlet 225.

The sleeve 224 has suitably bonded to the lower end 230 of same longitudinally extensible and contractible conduiting 232 that may be formed from a plastic material having a suitable convuluted or pleated configuration for this purpose, with the lower end 234 of the conduiting 232 being applied in force fitted relation to the upstanding end of a check valve device 236 that is of the type shown in FIG. 7 and having the positioning orientation shown in FIG. 7, with the sleeve 238 of the device 236 suitably bonded to the vessel top cap 114 in leak free relation thereto.

Figures 8, 9:
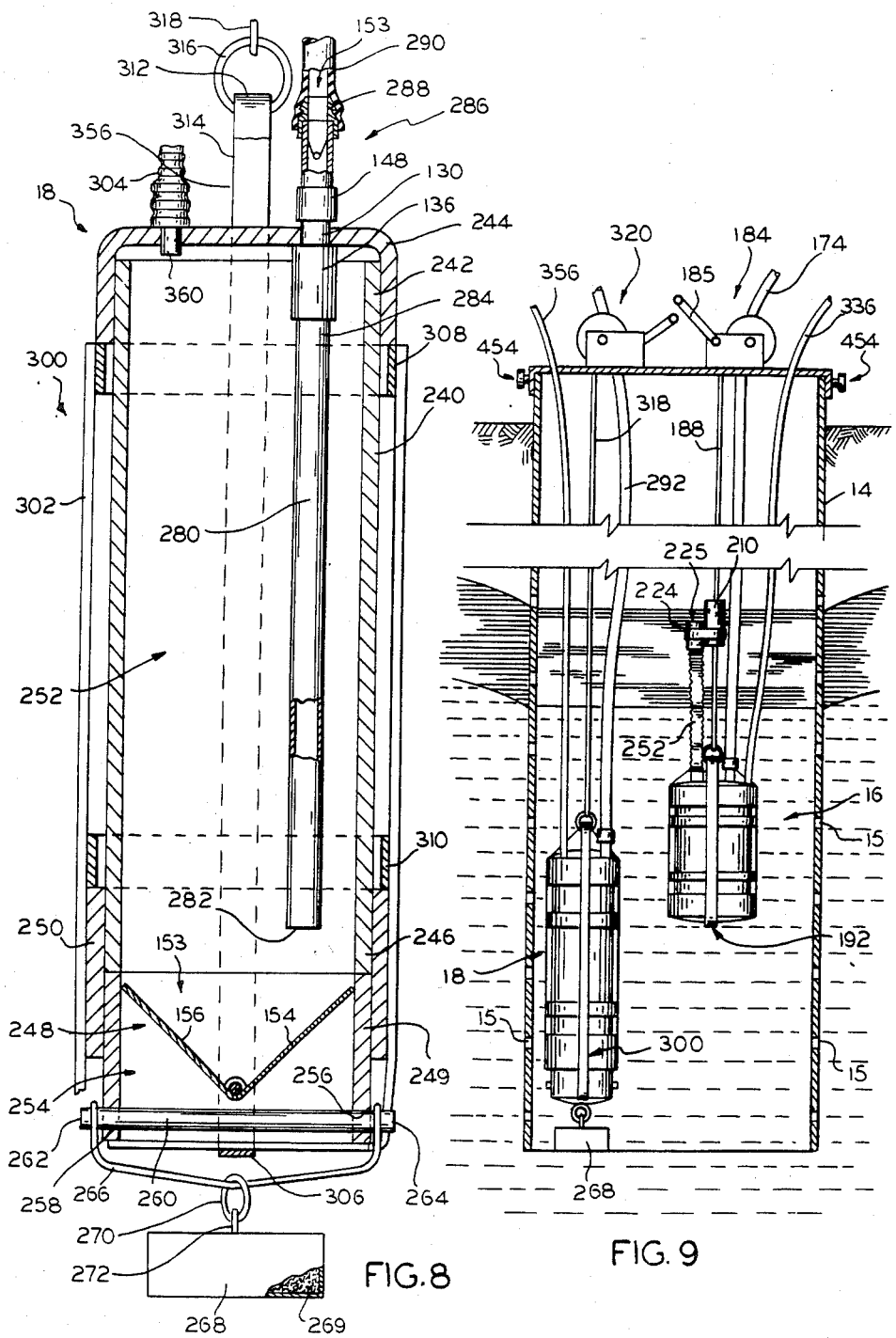
FIG. 8 is a view similar to that of FIG. 5, but illustrating the ground water draw down vessel or canister, diagrammatically, but in some detail.
FIG. 9 is a view similar to those of FIGS. 1-4, but showing the draw down vessel and the hydrocarbon liquids recovery vessel applied to the same well.

Referring now to FIGS. 3 and 8, the draw down vessel or canister 18 is of generally the same basic type of construction as the vessel or canister 16, but is preferably of greater volumetric capacity, and thus is longer, since both vessels 16 and 18 preferably are made to approximately the same diameters. Vessel 18 generally comprises elongate sleeve 240 having suitably fixed to its upper end 242 end cap 244. As is the case in connection with the vessel 16, the vessel 18 has its principal components formed from a suitable plastic material, such as the aforementioned PVC, with the top cover 244 being of dished configuration and suitably mounted in leak free relation to the upper end 242 of the sleeve 240 employing a suitable bonding solvent. The lower end 246 of the sleeve 242 has affixed to same a check valve 248 of the type 151 shown in FIG. 7, with the valve 248 disposed in a vertically opposite position to the showing of FIG. 7 and having an annular side wall 249 substantially the same size as and aligned with the lower end 246 of the sleeve 240 and affixed thereto by anchoring sleeve 250; for this purpose the side wall 249 of the check valve 248 is formed from the indicated PVC material and sleeve 250 is bonded in leak free relation to both the sleeve or shell 240 and the side wall 249 employing suitable solvent bonding materials. As indicated in FIG. 8, the shell 240, cover 244, and check valve side wall 249 define a vessel chamber 252 that is open at the lower end 254 of same except when closed by check valve 248. The check valve side wall 249 is formed with a pair of oppositely disposed cross apertures 256 and 258 in which is secured cross bar 260 (as by employing suitable cement), the opposite ends 262 and 264 of which protrude outwardly of the vessel to serve as supports for a suitable connector 266 formed from wire or rope or the like and anchored at its ends to the bar 260, and supporting a box 268 containing lead shot 269 or the like by way of suitable links 270 and 272, or the like, whereby the vessel 18 is likewise provided with a ballast on its lower end. The ballast may also be formed by a block of cement or stone or the like, and the ballast of box 268 should have a weight in the range of from about ten to about one hundred pounds, depending on conditions, and the size of vessel 18 employed for any particular installation. The vessel 18 carries tubular member 280 that is comparable to the tubular member 134 of vessel 16, and which defines the vessel outflow port 282 at the lower end of same. The tubular member 280 adjacent to its upper end 284 is affixed to the vessel top cover 244 in the same manner that tubular member 134 is secured in place, as indicated by corresponding reference numerals. The tubular member 280 thus has secured thereto check valve device 286 that is of the type 151 indicated in FIG. 7, and that is oriented in the same manner as the check valve device 144 of FIG. 5. Check valve device 286 has nipple 288 suitably affixed to same that receives in sealed relation thereto the lower end 290 of flexible piping or hosing 292, in the same manner as indicated for vessel 16. Piping or hosing 292 at its end 294 is suitably connected to stand pipe 296 that is in turn connected to the water discharge enter or conduiting 26. The flexible hosing end 294 may be equipped with the suitable fitting 298 for this purpose, to provide a conventional screw threaded seal connection to the stand pipe 296, or a similar connection of any suitable type that will provide the seal connection needed, as will be obvious to those skilled in the art. The piping 292 and standpipe comprise the diagrammatically illustrated conduiting 24 of FIG. 10.

Vessel 18 in use is also applied to a suitable basket structure 300, that illustrated comprising a pair of strappings 302 and 304 (see FIG. 8) of the same type as the corresponding basket strappings for vessel 16, suitably stitched together as by 306, and reinforced by transverse circumferential strappings 308 and 310 that are also suitably stitched in place. The ends 312 and 314 of the strapping 304 are suitably connected to anchor ring 316 to which the lower end of cable 318 that suspends the vessel 18 in the well is applied. As is the case with the cable 188 of the vessel 16, the cable 318 for vessel 18 is suitably applied to winch 320 that is mounted on the well casing top cover structure 322 for this purpose, with the cable 318 passing through suitable aperture 324 formed in the cover structure 322 for this purpose. As is the case for cable 188, the winch 320 may be of any suitable type, that illustrated being the hand operated model 1000 that is offered commercially by Dutton-Lainson Co. of Hastings, Nebr., and that is provided with hand crank arm 323 for adjustment purposes and suitable braking means to hold the respective vessel, in the desired position of adjustment.

As has been previously indicated, the invention contemplates that the chambers of the vessels 16 and 18, when charged with liquid, will be discharged by employing an ejecting action on the liquid through the use of compressed air, under the control of the system diagrammatically illustrated in FIG. 10, including the timing mechanisms that have been indicated, the solenoid operated three way control valves 38, and the pressure regulating devices 40, as well as the associated conduiting that is diagrammatically illustrated.

With regard to the vessel 16, in the showings of FIGS. 1 and 2, the pressure header 30, for each well 12, is shown to have a stand pipe 330 connected thereto that at its upper end 332 includes conventional elbow 334 to which the air pressure control regulator 40 is connected for supplying air pressure under a predetermined psig to the solenoid operated three way control valve 38, the operation of which is controlled by timer mechanism 58. Flexible flow conduit 336 has its upper end 338 suitably connected to the three way control valve device 38, and its lower end 340 suitably connected to conventional fitting 342 that is in leak free sealed relation with the top cover 114 of vessel 16 (not shown in FIG. 5).

The three way control solenoid operated devices 38 and 44, the air pressure regulators 40 and 46, and the timer devices 58 and 67, may be conventionally available devices. For instance, the three way valve device 38 may be one of the ASCO three way solenoid valves made and sold by Automatic Switch Company of Florham Park, N.J., such as that company's model Nos. 8316 or 8317, with the two alternate positions of the three way valve being indicated in FIGS. 1 and 2, whereby the position of FIG. 1 the valve 38 is to vent the vessel chamber 118 to atmosphere through conduiting 36 and close same off from the air pressure of header 30, while in the position of FIG. 2, the valve venting aperture or orifice is closed off and the chamber 118 of vessel 16 is connected to the pressure of the header 30 through air pressure regulator 40. Valve 38 is basically a housing having a spring biased plunger which is magnetically to one position when energized (for instance the position illustrated by the showing of FIG. 1), and spring biased to the opposite position when the solenoid is deenergized (the position of FIG. 2).

The pressure regulators 40 and 46 may be the Speedair Air Pressure Regulator offered by Dayton Electric Manufacturing Co. of Chicago, Ill., which can be adjusted to give any air pressure desired. The model number to be used will depend on the size of the device needed in view of the depth of the well in question, the length of the air line 336 and the head against which the air under pressure is to be supplied to the vessel.

The timer mechanisms 58 and 67 may be the Eagle Time Miniflex Series industrial control device offered by Eagle Signal Division of Gulf Western Industries Inc. of Austin, Tex. and Davenport, Iowa (such as Model No. DA100). These devices are solid state on/off repeat cycle timers using integrated circuits for timing function. However, any suitable adjustable on/off type timer could be employed for this purpose including those that are controlled by fluids or mechanisms such as mechanical clock mechanisms.

As to the vessel 18, as indicated in FIGS. 3 and 4, the header 30 is provided with a separate stand pipe 350 having an elbow 352 at its upper end which is connected to pipe 354 that is in turn connected to pressure regulator device 46 that supplies air at the desired pressure to three way control valve 44 that operates under the control of timer mechanism 54. The control valve 44, the regulator 46, and the timer device 54 may be of the same type as the corresponding control valve 38, pressure regulator 40, and timer device 58 that are provided in connection with the vessel 16.

Suitable fluid flow conduit or connector 356 has its upper end 358 suitably connected to three way control valve 44, and its lower end 359 suitably connected to conventional fitting 360 that is affixed to the end cap 244 of vessel 18 in any suitable manner in leak free relation thereto for venting the chamber 252 to atmosphere through valve 44, and alternately supplying air pressure to chamber 252 from header 30 through pressure regulator 46 and valve 44 to eject liquid received in the chamber 252 from same.

The length of the flexible hosing or piping that are to form the conduits 174 and 336 for the vessel 16, and the corresponding hosing or piping 292 and 356 for the vessel 18, will depend on the depth of the ground water table at any particular well site, the amount of draw down that is to be provided for, and the like, and in addition, three to five feet or so additional footage should be provided for to provide for adjustment to take care of any fluctuations that are incurred during operation of the installation.

In the showings of FIGS. 1 and 2, the stand pipe 330 and associated piping are diagrammatically represented in FIG. 10 by conduiting 34 and 36, while in the showing of FIGS. 3 and 4 the stand pipe 350 and associated piping are represented in FIG. 10, by conduiting 34 and 42. Flexible connectors 336 and 356 of FIGS. 1 and 3 are represented in FIG. 10 by conduits 48 and 50 respectively. The well casing covers 186 and 322 are suitably apertured to pass the piping 174 and connector 336 of FIGS. 1 and 2, and the piping 292 and connector 356 of FIGS. 3 and 4, respectively.

Operation of Installation

In practical application, in readying an installation or installations for practicing the invention at a particular refinery site or the like, the area involved requires careful inspection and study for its underground characteristics to determine the existing level of the ground water table, the amount of hydrocarbons in association with the same, the nature and characteristics of the soil and other geological aspects involved, and the like. Where wells comparable to wells 12 exist, they will be very helpful in determining the information needed, and it may be necessary to drive or form one or more additional wells, and in all instances, a casing such as casing 14 needs to be provided to shore up each well, and as indicated, the casing should have a multiple of suitable apertures 15 in spaced apart relation along the height of the casing to provide for free flow of the liquids involved into the well. In some cases, where the site involves a barrier trench, as at gasoline stations and the like, the well casing may be disposed in the trench and held in place by gravel backfill, to define a well 12.

As indicated, where the wells 12 are to be of smaller diameter due to the conditions encountered or specified in setting up the installation, the vessels 16 and 18 are applied to separate wells. Where the wells can be of a larger size to accommodate both vessels in the same well, then the approach indicated in FIG. 9 is employed.

Where the wells are proportioned to receive only a vessel 18 or a vessel 16, a vessel 18 may be applied to a centrally located well 12, and one or more adjacent wells 12 that will be within the cone of depression provided by the operation of vessel 18 may each have a vessel 16 applied thereto. The size of the cone of depression in terms of the spacing of its circumference from the vessel 18 creating same will depend on the water handling capacity of the vessel 18 in question, the porosity of the soil involved, and the land owner's needs and requirements for hydrocarbon recovery from the installation site involved.

In any event, the air header line 30 and the water header or convey away conduit 26, as well as the hydrocarbon liquid recovery line 22, are all located adjacent the ground surface, and preferably are applied just below the ground surface and covered for protection purposes, as suggested by the showings of FIGS. 1-4 and 11. These conduits for each well are laid out in the manner diagrammatically indicated in the drawings, with the respective specific pieces of conduiting used for connection to the air compressor, the water carry off conduiting or header, and the hydrocarbons recovery piping being connected as needed for the air pressure supply purposes, the ground water carry away purposes, and the hydrocarbons recovery purposes contemplated by the present invention, as has been explained.

In the showings of FIGS. 1-4, the ground water table is indicated by reference numeral 380, with its upper surface level being indicated by reference numeral 382. The body of petroleum origin liquid hydrocarbons that is to be recovered, generally speaking, forms its own table as indicated at 384, on top of the ground water table 380, with the upper level of the hydrocarbons being indicated by reference numeral 386.

Assuming an installation such as that indicated in FIGS. 1-4 (as supplemented by FIG. 10), in which a given well 12 has a vessel 18 applied to same, and an adjacent well 12 (which should be in the cone of depression created by the vessel 18 in question) as already indicated, has a vessel 16 operating therein, the respective vessels are operated in the alternate manners indicated in FIGS. 1 and 2, and 3 and 4. The same manner of operation is involved for the respective vessels 16 and 18, regardless of whether there are only two wells with one well having a vessel 16 and the other well having a vessel 18, or where one well has both a vessel 16 and a vessel 18 (as indicated in FIG. 9) or a series of adjacent such wells, or where a single well has a vessel 18 applied to same, and a plurality of wells are formed about the single well in question, in radially spaced relation thereto, and each has a vessel 16 applied to same.

In any event, the vessel 18, (which is to serve the draw down functions of the invention), which for any given well in which it is employed is suspended by cable 318 that is connected to the basket 300 for same, is lowered to be closely the adjacent the bottom of the well, and as a matter of fact it is preferred that the ballast 268 be rested on or be closely adjacent the bottom of the well. This insures that only ground water is removed from the well by the vessels 18.

The vessels 18 that are employed in a given installation are set into operation under control of timer 54 so that they alternate between the positions shown in FIGS. 3 and 4 to provide for charging them with ground water to any desired capacity and then discharging therefrom the water charge in question into carry off header 26. In the operative relation shown in FIG. 3, the three way control valve 44 is positioned to vent the vessel chamber 252 to atmosphere through conduit 356, and the static pressure of the ground water disposes the flapper members 154 and 156 of check valve 248 in their folded, substantially parallel relation to freely admit the ground water into the chamber 252, which static pressure expels the air within the chamber 252 to atmosphere through the conduit 356 and valve 44. When the chamber 252 is filled or filled as desired with a charge of ground water, the position of the three way valve 44 is reversed by the action of timer 54 to admit compressed air from the header 30 through the three way control valve 44 and conduit 356 to expel the ground water received in the chamber 252 through outlet port 282, tube 280, and the check valve 286, through conduiting 292 into the ground water and carry off header 26, which header should carry the water to a point of storage or other disposal that is at a remote location from the wells being treated by the installation in question.

As indicated, the function of the vessels 18 and their conduiting and controls is to receive and trap the ground water charge in same, and to effect removal of the water from the ground water table level and into and through header 36 at a rate which is adequate to form the cone of depression that is diagrammatically illustrated at 390 in FIGS. 1–4. What this involves is that the water is being removed from the well at a sufficient rate timewise so that the ground water table adjacent the wells having vessel 16 disposed therein is depressed downwardly so that the body 384 of hydrocarbons on top of same tends to gravitate into the well and form a body 391 of recoverable liquid hydrocarbons within the well casing 14 that is involved. Experience has shown that for most applications, adequate ground water draw down can be provided for by effecting ground water removal in the range of from about twenty gallons per minute to about one hundred twenty-five gallons per minute, though at some installations, where ground water presence is high the water removal rate might be in the 125 to 225 gallons per minute range, where excess water is involved, as for instance, from underground springs and the like. For any particular installation, the vessel chamber 252 is sized volumewise to provide for the ground water removal rate needed for that particular installation.

In any event, the timer device 54 is conventionally arranged to be set to operate the vessels 18 and associated parts at the time sequence rate that will provide the water charging and removal rate which will form the cone of depression that is desired for any given installation so that at the same or adjacent wells having the hydrocarbons recovery vessels 16 disposed in same, the hydrocarbons will collect to form the indicated body 391 of same. In the diagrammatic illustration depicted by FIGS. 3 and 4, when the timer mechanism 54 has its control arm 68 set at contact indicator 70, the control valve 44 is disposed by, for instance, the solenoid involved in its arrangement (as referred to hereinbefore), in its vent position, in which ground water from the bottom of the well enters the chamber 252 and displaces the air therefrom through valve 44. The function of check valve 286 (which is diagrammatically indicated in FIGS. 3 and 4) is to prevent any liquid in the conduit 292 above valve 286 from entering the chamber 252 during this period. As time goes by, the indicator arm swings over to the contact indicator 72, at which point the position of the solenoid valve reverses (for instance, by deenergization of the solenoid and under the biasing action of the valve spring), to set the components involved in the position indicated in FIG. 4, in which the valve 44 closes the chamber 252 against venting to the atmosphere, and compressed air is supplied through regulator 46 and valve 44 to chamber 252. As indicated, the regulators 46 are commercially available and adjustable to provide any uniform or constant pressure output to the valve 44 and vessel chamber 252 that is desired or needed in terms of psig. Normally this pressure will be in the range of from about 10 to about 200 psig, depending on operating conditions, including the fluid head that the chamber 252 is subjected to.

In any event, the air pressure acting on the liquid within the chamber 252 exceeds the static pressure of the water acting on check valve 248, which disposes its flapper members 154 and 156 in the flow blocking, angularly related, liquid charge trapping, positions, shown in FIGS. 4 and 8, while the check valve 286 changes position to the outflow permitting relation indicated in FIG. 7, whereby the ground water is ejected from the chamber 252 through outlet port 282, tubular member 280, and into flexible conduit 292 and thence to header 26. In the showing of FIG. 4, the timer device 54 has progressed to near the end of the emptying cycle for vessel 18. When the swing arm 68 of the device 54 reaches the position of contact indicator 74, the timer device is conventionally arranged to automatically resets it to the position indicated in FIG. 3, wherein the position of the solenoid operated valve 44 is again switched to its air pressure blocking and vessel chamber venting relation that is indicated in FIG. 3 (it being conventionally equipped for this purpose). Thus, the operation of the apparatus involved between the contact indicators 70 and 72 represents the filling cycle of the vessel 18, while the operation of same between the indicators 72 and 74 represents the emptying cycle of same.

With the operation of the vessel or vessels 18 having proceeded to the point where the cone of depression 390 is present at the wells being treated in accordance with the present invention, the vessels 16 are put into operation. As indicated in FIGS. 2 and 3, the vessels 16 are suspended within the wells 12 to which they are applied to locate the upper ends 228 of their intake port defining sleeves 224 closely adjacent the level 394 of the body 392 of the hydrocarbon liquids that are within the well casing 14, on top of the ground water that is also in same. In this connection, the upper end 228 of the sleeve 224 should be disposed a short distance beneath the level 394, such as no more than about one half inch with the sleeve 224 being fixed to the float 210 to provide such spacing, and the float 210 is intended to have its upper end above the surface 394 a sufficient amount so that it can be readily viewed from the top of the well casing. This insures that the highest concentration of the hydrocarbon liquids will be admitted to the vessel 16, and will avoid the intake of any air. While there will be some mixing of the hydrocarbon liquids with the ground water that has occurred over a period of time due to the rising and falling of the ground table and other factors, adjacent the top level or surface 394 of the body 392 the hydrocarbons will be either free of water or in a condition of maximized freedom from water content.

With the winch 184 appropriately set to so suspend the vessel 16 in the well 12 as indicated, the timer mechanism 58 is operated to put the vessel through its filling and emptying cycles, it being conventionally arranged to so operate in the same manner as identical timer mechanism 54, but in a range that is appropriate for recovery of the hydrocarbon liquids, as distinguished from the range required for vessels 18 to form the indicated cone of depression. Thus, when the timer mechanism 58 the its arm 60 at the contact indicator 62 position, the three way control valve 38 has the positioning indicated in FIG. 1, wherein the vessel chamber 118 is vented to atmosphere through the flexible conduit 336 and valve 38, and check valve 236 is in its liquid flow permitting position as indicated in FIGS. 5 and 7, whereby the liquid hydrocarbons enter the open end 228 of sleeve 224, and descend through the flexible conduit 232 through valve 236 into chamber 118. Air displaced from chamber 118 by the entry into same of the liquid hydrocarbons passed the check valve 236 passes through conduit 336 and valve 38 to atmosphere. The check valve 144 at this stage is in its closed position, to which its flapper members 154 and 156 gravitate, and should there be liquid hydrocarbons in conduit 174 upstream of valve 144, it serves its check valve function at this stage in preventing reentry of same into the chamber 118.

When the timer mechanism swing arm 60 has moved to its contact indicator 64 position, the fill cycle ends and the emptying or hydrocarbons excavation cycle starts, which involves the three way valve 38 switching to its indicated position wherein venting to atmosphere of chamber 118 is closed and compressed air is admitted through the valve 38 to chamber 118 through conduit 336. The static pressure of the compressed air acting on the liquid hydrocarbons now in the vessel chamber 118 effects a closing of the check valve 236 to preclude discharge of the hydrocarbons through same, and opening of the check valve 144, whereby the compressed air ejects from the chamber 118 the liquid hydrocarbons that have been received and in effect trapped in same. The regulator 40, as already indicated, is adjusted to suit conditions to provide the desired constant air pressure for evacuating the liquid hydrocarbons from the chamber 118. In the showing of FIG. 2, the timer mechanism swing arm 60 has progresse to closely adjacent the contact indicator 66, so that it is well into the empty cycle of the vessel 16 involved. At the end of the empty cycle, at which the swing arm 60 is aligned with the contact indicator 66, the timer mechanism by reason of its aforereferred to conventional arrangement automatically resets to the position indicated in FIG. 1 to repeat the filling and emptying cycles of the vessel 16. The air pressure made available by regulator 40 for application to the liquid hydrocarbons in the vessel 16 to effect the emptying stroke, and the timing of the operation of the apparatus involved should provide for removing the liquid hydrocarbons at a rate in the range of from about one gallon per minute to about five gallons per minute, depending on conditions at the well site, including the fluid head acting on chamber 118. As indicated, the liquid hydrocarbons during the vessel empty cycle are ejected through the vessel outlet port 140, through tubular member 134 past the now opened check valve 144, through conduit 174 and into the hydrocarbon liquid recovery line 22 where they, together with the other liquids supplied to line 22 by the other vessels 16 that are operating, are conveyed to a suitable remotely located storage tank or the like to await processing as needed to restore their commercial viability.

The ballast for both vessels 16 and 18 is provided to stabilize them and enable them to be submerged in the liquids in both the full and empty states of the vessels. The ballast may be made up of any suitable dead weight material, such as lead shot, stones, cement, or the like.

Where the vessels 16 and 18 are both applied to the same well, as indicated by the showing of FIG. 9, their related components and equipment, the connections involved, and their manner of operation is the same as has already been described.

The vessel 18 may also be employed to control the level of the upper surfacing of the ground water table and the liquid hydrocarbons that are adjacent and lying on same. This may be done by disposing the vessel 18 to that the normal ground water upper surface 382 and the normal hydrocarbon liquids upper surface 386 are intermediate the upper and lower ends of vessel 18, and then operating the draw down equipment involved to effect a gallon per minute ground water removal action that approximately equals the flow of the ground water and liquid hydrocarbon liquids into the well. As the volume of the vessel chamber 252 is sized in accordance with the ground water removal rate found necessary to effect adequate draw down at the site in question (as hereinbefore disclosed), by operating the thus positioned vessel 18 in question for ground water removal purposes at the same cycles per unit of time with the result that the gallon per minute water outflow is a fraction of the rated vessel capacity (for instance, one half, where the vessel is positioned so that its chamber 252 will be filled only one-half its capacity during its "fill" cycle), the indicated level controlling ground water removal action will be in effect. This method of operation of the draw down vessel 18 permits the establishment of a ground water table level that is substantially constant as long as the draw down vessel 18 operates in the manner indicated, and the ground water conditions at the site in question remain approximately the same.

Figure 11:
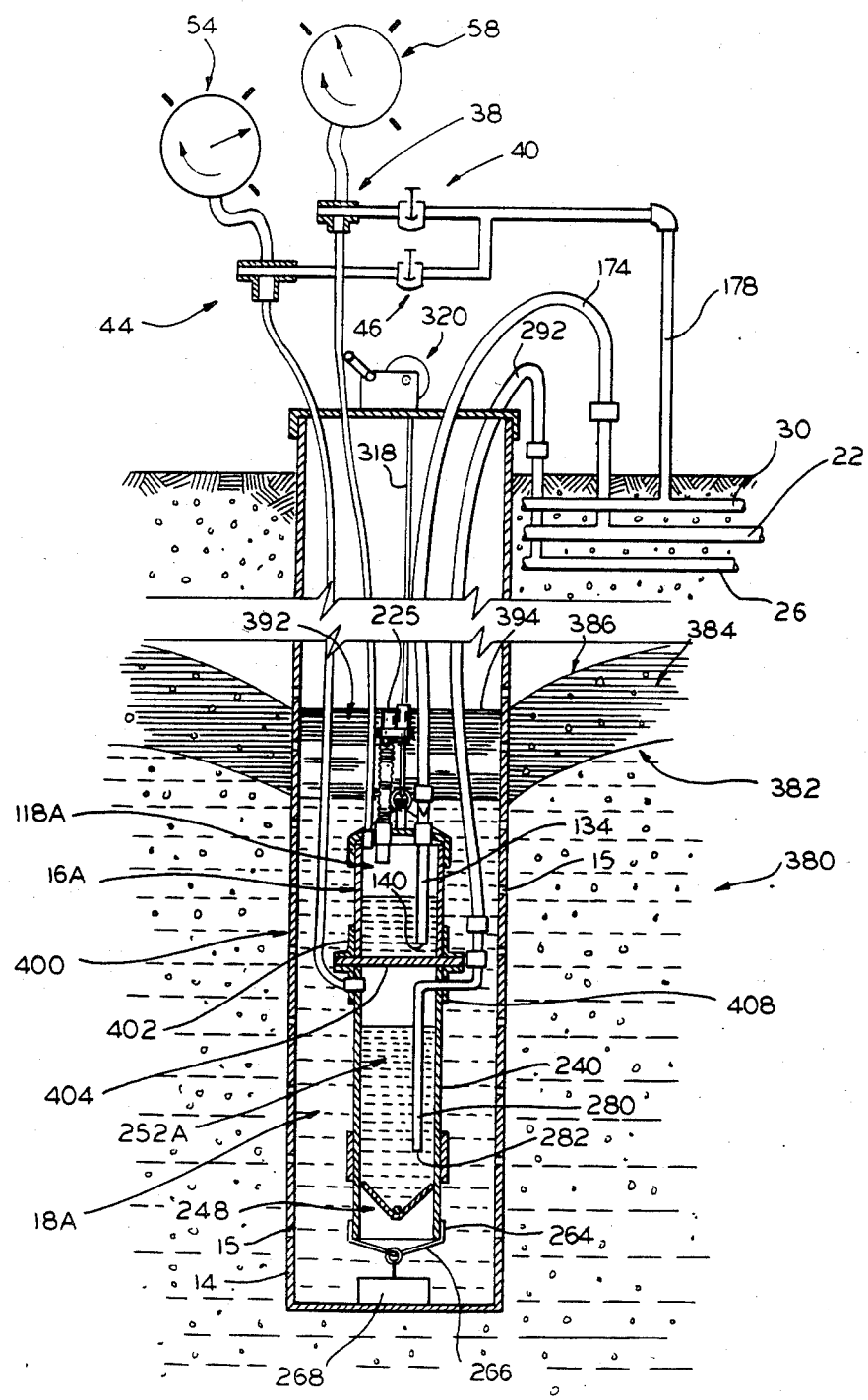
FIG. 11 is a view similar to those of FIGS. 1-4, showing a modified form of the invention in which the draw down vessel and the hydrocarbon recovery vessel are integrated in a single unit and applied to a single well.

In the embodiment of FIG. 11, a composite vessel assembly 400 is illustrated, in which the upper vessel is a hydrocarbon trapping and ejecting vessel 16A defining hydrocarbon receiving chamber 18A. The vessel 18A, instead of having lower end wall 115, is affixed to the annular angle member 402 that is in turn affixed to separator plate 404. The vessel section 18A that defines the ground water receiving chamber 252A, instead of having the upper end cover 244, has the sleeve or side wall 240 affixed to a second angular member 408 that is in turn affixed to the divider plate 404. These components may all be formed from the indicated PVC material and fixed together in leak free relation employing suitable bonding cement or the like.

The composite mechanism 400 is received in a suitable basket 410 that is comparable to the respective baskets 194 and 300 for connection to, for instance, cable 318 of a winch 320. The hydrocarbons receiving vessel 16A is otherwise arranged essentially as indicated in FIGS. 1, 2, 5 and 7, including the venting and compressed air connections to same, while the corresponding connections of the draw down vessel section 18A are extended in leak free relation through the sleeve 240, with comparable components being indicated by reference numerals that are the same as those employed for corresponding components in FIGS. 1-4, 5 and 7, respectively, as are the connections for same. Since one well 12 is operated on in the showing of FIG. 11, the compressed air may be supplied to the respective vessels 16A and 18A from a common header 30 that serves both three way valves 38 and 44, as indicated in FIG. 11.

Figure 6:
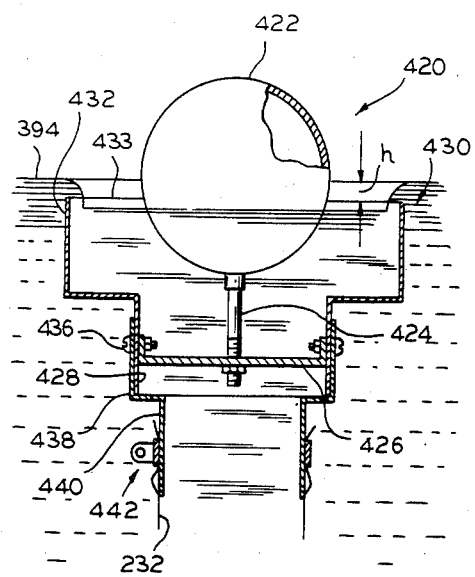
FIG. 6 is a fragmental vertical sectional view, that is similar to that of FIG. 1 with regard to the illustration of the hydrocarbon receiving vessel liquid inflow arrangement, showing on an enlarged scale a modified form of inflow port and float arrangement therefor.

In the modification of FIG. 6, an alternate form of liquid hydrocarbons intake combination float and intake port device 420 is illustrated in which the spherically contoured hollow float 422 is anchored by a suitable stem 424 to a cross plate 426 has secured across the reduced diameter discharge portion 428 of a floating wier 430 that defines annular circum-ambient side wall 432 within which the float 422 is centered, with the float 422 having the requisite bouyance to hold the wier 430, and namely the upper edge 433 of its side wall 432 just below the level 394 of the liquid hydrocarbons that are within the well being serviced by a vessel 16. The wier discharge end 428 has suitably affixed to same by the screws 436 that secure the cross bar 428 in place a suitable fitting 438 having a depending end portion 440 to which the upper end of the flexible conduiting 232 is connected, as by employing suitable clamp device 442.

The float devices illustrated for the embodiments of FIGS. 5 and 6 are provided so that the inflow port of the vessel 16 that is employed, as defined by a sleeve 224 or the wier 430, remains at the indicated predetermined distance below the top surface 394 of the hydrocarbon liquids, with the longitudinal, expansible and contractable flexible connector 232 extending and contracting as the level of the hydrocarbons liquids varies relative to the location of the vessel 16 served by same. The thickness dimension "h" of the hydrocarbon liquid that is in effect skimmed off the hydrocarbon body 391 may be controlled by adjustably throttling the venting to atmosphere through valve 38, and preferably downstream of the valve 38 venting discharge port 450, as by employing a suitable venting orifice or passage adjustable throttling device of any conventional type.

It will therefore be seen that the invention provides methods and apparatus for recovery of petroleum origin liquid hydrocarbons from ground water tables, thereby in effect decontaminating the ground water, and has a number of advantages.

For instance, with regard to the components of the apparatus that are to be submerged in the liquids, there are no moving parts except for the double flapper type seatless check valves, the opening and closing of which are in response to the direction of fluid flow past same, and the static pressures on either side of same. Further, there are no electrical controls or electrically operated motors to be located in either the well or the casing therefor. The only electrical equipment involved that may be adjacent the well is the solenoid actuated three way control valve and timer controls therefor, which are located outside the well, and can be remotely located if so desired.

The prime mover for ejecting the trapped liquids from the respective vessels is compressed air, and the source of compressed air may be centrally located with regard to the installation site in question, for ease of maintenance and reduction of costs. At many sites where this invention is applicable, a source of compressed air already exists, which avoids the need for installing expensive electric motors and compressors to operate air compressors.

The timing of the liquid receiving and ejecting vessels, in operation, is readily changed to meet changing well conditions. As indicated, the timing devices for controlling the fill and emptying cycles of the vessels can readily be adjusted to provide any time of operation desired for either cycle. While those specific timers referred to are preferred, any suitable off-on type adjustable timer will be satisfactory. This arrangement avoids the need for having liquid pumping equipment furnished with expensive variable speed drives.

As it is important to draw down the water table level as little as possible, since once the ground is contaminated with oil, it will remain to a degree contaminated, the use of one of the draw down vessels 18 as a liquids level control device insures positive level control, where this is desired, without requiring the use of expensive level sensing devices of a conventional nature.

The floating hydrocarbons intake arrangement permits the intake port of the hydrocarbons receiving and ejecting vessel to have intake of the hydrocarbons from closely adjacent to the top surface or level of same, which allows only the highest concentration of the hydrocarbons to enter the vessel. Use of centrifugal pumps or the like with an intake similarly located could be expected to draw air into the pump resulting in damaging cavitation.

Furthermore, the hydrocarbons as well as the ground water are in effect extracted from within the well and lifted or shifted to ground level and carry away conduiting therefor without any agitation of the liquids involved. It sometimes is the case that the hydrocarbons have some water mixed in with it, and which when such a mixture is pumped by centrifugal pumps or the like the oil and water is emusified, making separation of the pump product difficult.

As has been pointed out, the draw down vessels can be placed closely adjacent the bottom of the well for intake of liquids that are contamination free water. The shaping of the draw down vessels adapts the vessel lower end for close spacing with regard to the bottom of the well, and this arrangement is not available with conventional centrifugal pumps that might be used for the same purpose. Further, since the draw down vessel has essentially no moving parts other than the very simplified check valve arrangements referred to, maintenance requirements are minimal, as distinguished from the high maintenance requirement for centrifugal pumps due to well bottom debris that centrifugal pumps encounter adjacent the bottom of the well.

The invention is adapted for use at any site where liquid hydrocarbons have accumulated underground because of the particular use of the site, which would be involved in such facilities as oil refineries, oil and gasoline storage and dispersing facilities, gasoline stations, and the like; the invention is also applicable to recover hydrocarbons that have seeped underground at the sites of pipe line leakage or breakage.

The depth of the cone of depression that will be required in the ground water for any particular installation, and the amount of ground water that will have to be removed from the ground water table to create it, will be determined for any particular installation by such requirements as the porosity of the soil, the apparent recoverable amounts of hydrocarbons involved, the depth of the ground water table, and the requirements specified by the property owner and/or his consultant. Ground water removal that is effected to form the cone of depression may also be applied about the periphery of the cone of depression to induce movement of the hydrocarbons into the cone, whereby the disposed of ground water would tend to flow back into the cone and in effect push the hydrocarbons ahead of it into the cone. This in effect would be making an "artificial recharge".

Further, where the hydrocarbon liquid body on top of the ground water is deep enough, initially it may not be necessary to form a cone of depression in the ground water at a well to adequately recover the liquid hydrocarbons using a vessel 16 until the body of liquid hydrocarbons involved is reduced to the point where the cone of depression formation is required to keep up adequate performance.

In a modified application of the invention, either the vessel 16, or the vessel 18, and, of course, the components and equipment related to each, respectively, the connections involved, and their respective manners of operation, may be employed to remove both liquids within a well, that is, both the hydrocarbons that are lighter than water and the ground water (hereinafter sometimes referred to as the "total liquids"), for later separation purposes. This mode of arrangement and operation normally is practiced in smaller diameter wells (for instance, where the casing 14 has a diameter in the range of from about three inches to about six inches), with the vessels 16 or 18 employed for this application being dimensioned transversely thereof accordingly, and with the draw down vessel 18 of the two vessels 16 and 18 being preferred.

Figure 12:
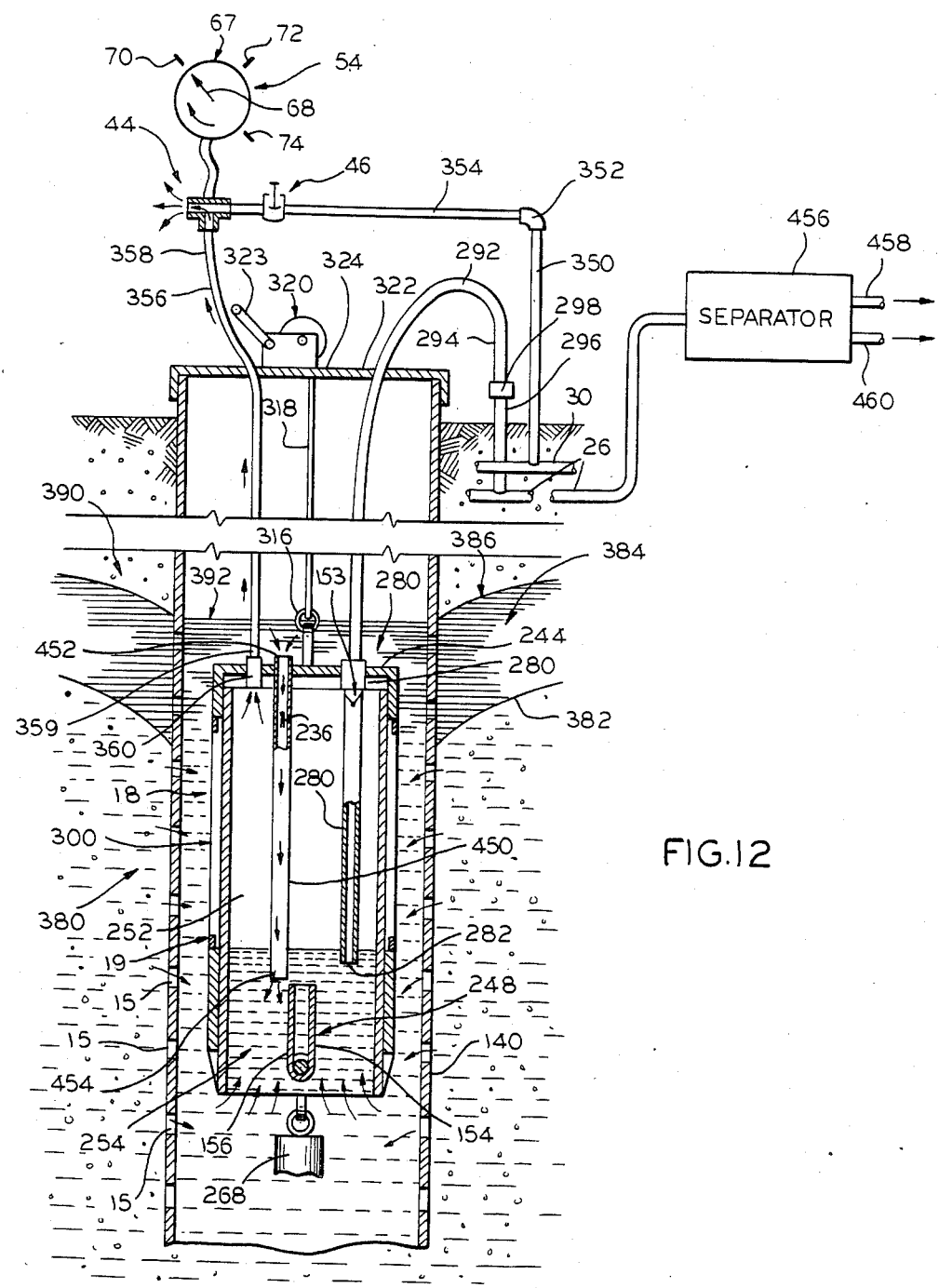
FIG. 12 is a view similar to that of FIG. 3, but illustrating a total liquids recovery vessel that is similar to the ground water draw down vessel or canister of FIGS. 3, 4, and 8, with the modified vessel or canister being shown in its intake phase.

FIG. 12 illustrates a vessel or canister 19 more suitable for this purpose of which the vessel 19 is basically similar to vessel 18 (and is connected to similar components and equipment, as indicated by the similar reference numerals involved), but in addition it includes a pipe 450 having its upper end 452 open and above end cap 244 to freely receive the liquid hydrocarbons, and equipped with a check valve 236 (see FIGS. 1, 2 and 5); the lower end 454 of pipe 450 is open to chamber 252 below the level of outflow port 282 of tubular member 280 and above the paths of movement of flapper members 154 and 156 of check valve device 248. In addition, conduiting 24 (not shown in diagrammatic FIG. 12, but see diagrammatic FIG. 10) and header 26 of this embodiment are connected to a suitable separator 456, such as the well known Oklahoma separator, or the well known Casper separator, or some other suitable specific gravity separator of a conventional type, from which the separated hydrocarbons leave, as at 458, for conveyance to a suitable storage tank or the like to await restoration processing, and the ground water leaves, as at 460, for conveyance to a point of storage or other disposal. For this purpose vessel 19 is disposed as indicated in FIG. 12 and operated as described in connection with vessel 18 (see FIGS. 3 and 4). As pumping of the total liquids in the well proceeds, both the ground water and the liquid hydrocarbons flow into the vessel 19, and are jointly ejected therefrom, using the check valve-compressed air system ejector arrangement herein disclosed, and with the hydrocarbon liquids entering vessel 19 through the open upper end 452 of pipe 450 and passing by open check valve 236 into vessel chamber 252 at the lower end 454 of pipe 450; the ground water enters vessel 19 to flow past check valve 248, on charging of vessel 19, and the liquids are discharged from vessel 19 following the procedure of FIG. 4, with check valve 236 closing as shown in FIG. 2 to maintain the head on the end 452 of pipe 450 during this procedure. The result is that all the liquids are gently pumped from the well and applied to a header 26 (see FIG. 12) or the like free of emulsification, so that when received at one of the separators 456 indicated, separation of the hydrocarbons from the water is readily effected using conventional separation procedures, and subsequent handling of the hydrocarbons, and disposal of the water, for this purpose.

Where vessel 18 is used for total liquids pumping, it is disposed, as herein disclosed for controlling the level of the upper surfacing of the ground water table and the liquid hydrocarbons that are adjacent and lying on top of same, with the conduiting 24 and header 26 being connected to suitable separator 456. As pumping of the total liquids in the well proceeds, both the ground water and the liquid hydrocarbons flow into the vessel 18, and are jointly ejected therefrom, using the check valve-compressed air system ejector arrangement herein disclosed, with the result that all the liquids are gently pumped from the well and applied to the header 26 free of emulsification, so that when received at one of the separators indicated, separation of the hydrocarbons from the water is readily effected using conventional separation procedures, and subsequent handling of the hydrocarbons, and disposal of the water, for this purpose.

Where vessel 16 is employed for this purpose, it is disposed in the well liquids elevationally so that its sleeve open end 228 is well below the upper level 386 of the hydrocarbon table 284, and adjacent or even below the ground water table upper surface 382.

The total liquids pumping arrangements disclosed are to be distinguished from pumping systems employing centrifugal pumps and other mechanical displacement pumps, which so emulsify the liquids pumped that subsequent separation is not practical. All the advantages and their benefits of the hereindisclosed ejector are most dramatically achieved in the practice of this mode of the invention. As already indicated, the vessels 16, 18 or 19 employed for the practice of the total liquids removal concept are proportioned transversely thereof for easy fitting within the three to six inch (or thereabouts) diameter well in which this approach is normally practiced.

In a further modified application of the invention, the vessel 18, and, of course, the components and equipment related to same, the connections involved, and its manner of operation, may be employed to remove such heavier than water liquids that collect within a well.

FIG. 13 diagrammatically illustrates a vessel or canister 18 suitable for this purpose of which the vessel 18 of FIG. 13 is the same as the vessel 18 already described (and is connected to similar components and equipment, as indicated by the similar reference numerals involved), with the well 12A extending down through the ground, to and through aquifer 480 and into impermeable bed rock 482 defining a depression 484 into which heavier than water liquids 486 has collected. The well 12A may be conventional in nature, and for illustrative purposes it is shown as including suitable casing 14A which is suitably and conventionally aperatured as at 15A so that the liquids about casing 14A drain through the casing 14A into well 12A. FIG. 15 illustrates vessel 18 that is employed for this purpose, with corresponding reference numerals indicating components that have been previously described. Conduiting 24 and headers 26 and 30 are connected in the manner indicated in FIG. 10 for operation of the vessel 18 of FIGS. 13 and 15 in the manner already described (see FIGS. 3 and 4).

The basic principles of the invention are applicable also to recovery of other underground liquids, and in partircular, to liquids that are heavier than water, that is, such liquids have a greater specific gravity than water. Examples of such heavier than water liquids are chlorinated hydrocarbons, creosote, and methylene chloride.

It has been found that liquids in the heavier than water category also seep into the ground at locations where large amounts of such liquids have been stored and/or used for industrial purposes under circumstances where spillage can occur. An example is creosote at the locations of railroad tie creasoting plants, of which there have been many located within the U.S.A. and elsewhere, at which creosote, which is basically a cold tar product has seeped into the ground.

Common characteristics of these heavier than water liquids are that since they are very toxic, and not only tend to pollute the ground they seep into, they keep descending due to their heavier than water specific gravity and collect on top of liquid impermeable strata. Where there is a crevis or a crack in such strata, such heavier than water liquid continue to seep further underground until they reach crevis or crack free liquid impermeable strata where such liquids collect in depressions defined by such strata. The net result is that heavier than water liquids of the type referred to tend to accumulate in pools under ground water, and tend to seep downward in a depression defined by liquid impermeable strata in a cup like manner thereabout.

The principles of the present invention may be employed to remove such liquids from underground collections of same to avoid the pollution problems such liquids create.

The location of vessel 18 of FIGS. 13 and 15 adjacent the bottom of well 12A puts the vessel open lower end and its valve 248 in the body of the heavier than water liquids 486 that seeps into casing 14A, as through aperture 15A (well 12A is approximately centered on depression 484 for this purpose). As pumping of the liquids 486 from the well proceeds, the liquids 486 flow into the vessel 18, and are ejected therefrom, using the check valve-compressed air system ejector arrangement herein disclosed. The liquids 486 about the open end of vessel 18 seal off ground water therefrom, with the liquids 486 slowly flowing (due to their relatively high viscosity) into vessel 18 to flow past check valve 248, on charging of vessel 19, and the liquids 486 are gently pumped from the well and applied to a header 26 (see FIG. 15) or the like for conveyance to a suitable storage tank or the like to await further processing and/or disposal.

While a number of the wells 12A arranged as indicated will be needed at a particular site to effect removal of reachable liquids 486, creation of the herein-disclosed cone of depression or draw down is not normally required. However, it can be useful to create draw down, as herein disclosed since the cone of depression reduces the ground water pressure in the well 12A that otherwise would act on liquids 486, with the result that the liquids 486 flow better into vessel 18, and this expedites the pumping action involved. The use of the second vessel 18 in well 12A is to create a cone of depression 490 in the ground water 492 about the well 12A and entering casing 14A. The second vessel 18 is arranged, connected and operated in the same manner as the vessel 18 of FIGS. 3 and 4 (the connections for the lower vessel 18 of FIG. 14 being present as described but omitted to simplify FIG. 14).

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

What is claimed is:

1. Appratus for recovery of underground liquids that are heavier than water that lie below ground water from a well extending below ground surface level through the ground water and below the upper level of the heavier than water liquids within the well, said apparatus comprising:

a vessel having a liquids receiving chamber, said vessel including a liquids inflow port at its lower end and liquid inflow permitting, static pressure responsive check valve means for said inflow port confining flow of the liquids through said inflow port to flow of same in an inflow direction into the vessel chamber, said vessel including a liquids outflow port disposed adjacent and within the lower end of said chamber, and liquid outflow permitting, static pressure responsive check valve means for confining flow of the liquid from said chamber through said otuflow port to flow of same in an outflow direction and having an outlet adjecent the upper end of said vessel, a source of gas under pressure, piping for conveying the liquid from the well, said source of gas and said piping being located externally of the well and adjacent the ground surtace level, conduit means connecting said gas source to said vessel chamber and including fluid directional flow control valve means located exteriorly of the well including directional control means for venting said chamber to atmosphere therethrough and blocking off said gas source and forming the venting mode of said directional control valve means, and for communicating said gas source to said chamber free of venting of said chamber to the atomosphere and forming the chamber static pressurizing mode of said directional control valve means, pipe means for connecting said check valve means outlet to said piping with a corresponding liquid head, means for adjustably suspending said vessel in the well and holding same essentially stationary vertically with said inflow port thereof in said liquids, and means for switching said directional flow control valve means between said modes for establishing alternate vessel operation cycles of said liquids inflow to said chamber with venting of said chamber to atmosphere, opening of said vessel inflow valve means under the static pressure of the liquids in the well, and closing of said vessel outflow check valve means under the head of said pipe means, and gas pressurization of said chamber to evacuate the liquids therefrom into said piping through said vessel outflow valve means against said head of said pipe means and free of venting of said chamber to atmosphere and mechanical pumping of said liquids.

2. Apparatus for recovery of underground heavier than water liquids from a well, said apparatus comprising:

a vessel having a liquids receiving chamber, said vessel including a liquid inflow port at its lower end and liquid inflow permitting static pressure responsive check valve means for confining flow of the liquids through said inflow port to flow of same in an inflow direction into the vessel chamber, said vessel including a liquids outflow port disposed adjacent and within the lower end of said chamber and liquids outflow permitting, and static pressure responsive check valve means for confining flow of the liquids from said chamber through said outflow port to flow of same in an outflow direction out of said chamber and having an outlet adjacent the upper end of said vessel, a source of gas under pressure, piping for conveying the liquids from the well, said source of gas and said piping being located externally of the well and adjacent the ground surface level, conduit means connecting said gas source to said vessel chamber and including fluid directional flow control valve means located exteriorly of the well including directional control means for venting said chamber to atmosphere therethrough and blocking off said gas source and forming the venting mode of said directional control valve means, and for communication said gas source to said chamber free of venting of said chamber to the atmosphere and forming the chamber static pressurizing mode of said directional control valve means, pipe means for connecting said liquid outflow check valve means outlet to said piping with a corresponding liquid head, means for adjustably suspending said vessel in the well and holding same essentially stationary vertically with said inflow port thereof in said liquids, and means for switching said directional flow control valve means between said modes for establishing alternate vessel operation cycles of liquid inflow to said chamber with venting of said chamber to atomosphere, opening of said vessel inflow valve means under the static pressure of the liquid in the well, and closing of said vessel outflow check valve means under the head of said pipe means, and gas pressurization of said chamber to evacuate the liquids therefrom into said piping through said vessel outflow valve means against said head of said pipe means and free of venting of said chamber to atmosphere and mechanical pumping of the liquid, said switching means being exterior of the well and including means for selectively varying the time of operation of said operation cycles, said vessel at its lower end being open to define said inflow port, said inflow permitting check valve means being in said inflow port, said vessel including a conduit therein defining said vessel outflow port and connecting same with said outlet of said outflow permitting check valve means, said liquid inflow check valve means comprises a pair of oppositely acting flapper members mounted for free swinging movement about a common pivot axis extending crosswise of the direction of said inflow direction between a folded side by side inflow permitting relation in said vented mode of said directional control valve means, and an inflow checking relation in said chamber static pressurizing mode of said directional control valve means, said liquid outflow check valve means comprises a pair of oppositely acting flapper members mounted for free swinging movement about a common pivot axis extending crosswise of the direction of said outflow direction between a folded side by side outflow permitting relation in said chamber static pressurizing mode of said directional control valve means, and an outflow checking relation in said vented mode of said directional control valve means.

3. The apparatus set forth in claim 2 including ballast means suspended from said vessel lower end and spaced therefrom below same.

4. The method of recovering heavier than water liquids lying below ground water at a well extending below the ground surface level through the ground water and below the upper level of the heavier than water liquids within the well, said method comprising:

disposing within the well and at least partially within such liquids in the well a vessel defining a chamber that is open at its lower end thereof to freely receive such liquids, admitting such liquids of the well into the chamber through its open end, and venting to atmosphere the air within the vessel displaced by the quantity of such liquids admitted to the chamber, and thereby establishing a vessel chamber charging step, and while holding the vessel essentially stationary vertically and at the same level as disposed at in said disposing step, sealing the vessel chamber off from the atmosphere and the liquids that are externally of the vessel, and exposing the vessel chamber to a source of compressed air and conducting such quantity of liquids solely under the static pressure of the compressed air applied directly thereto, and in an isolated flow that is free of mechanical pumping, to a ground level located point of disposal that is remote from said vessel, and thereby establishing a vessel chamber discharge step, and while holding the vessel essentially stationary vertically and at the same level as said admitting step, and alternately repeating said vessel chamber charging and discharging steps while holding the vessel essentially stationary vertically to effect step by step withdrawal of such liquids from the well.

5. The method set forth in claim 4 including:

establishing a cone of depression in the ground water adjacent the well for reducing ground water pressure within the well acting on said liquids within the well.

6. An ejector pump for recovery of both underground liquid pertroleum origin hydrocarbons lying on ground water of a ground water table, and the ground water that is elevationally adjacent to the liquid hydrocarbons, from a well extending below ground surface level into the ground water table and below the level of the liquid hydrocarbons within the well on the ground water therein, said ejector pump comprising:

an elongated tubular vessel defining an upright liquid receiving, trapping, and pumping, chamber, said vessel including for each end of same a liquid inflow port, and liquid inflow permitting staiic pressure responsive check valve means for each said inflow port confining flow of the liquids through each said inflow port to flow of same in an inflow direction into the vessel chamber, said vessel including a liquid outflow port disposed adjacent the lower end of said chamber and liquids outflow permitting, static pressure responsive check valve means for confining flow of the liquids from said chamber through said outflow port to flow of same in an outflow direction out of said chamber and having an outlet adjcent the upper end of said vessel, fitting means mounted adjacent the upper end of said vessel for selectively conveying gases from said chamber for venting said chamber, under the pressure of the liquids entering the chamber as permitted through said liquid inflow ports by the respective said liquid inflow permitting static pressure responsive check valve means, and for selectively utilizing compressed gases as the prime mover effecting liquids removal from said chamber through said outflow port as permitted by said liquid outflow static pressure responsive check valve means, and free of mechanical pumping of the liquids as removed from said chamber, whereby, when said fitting means is connected to conduit valve means that includes timer operated directional control means for alternately venting said chamber to atomsphere and blocking off a source of said compressed gas to form the venting mode of said pump, and for alternately comminicating the source of said compressed gas to said chamber free of venting of said chamber to atmosphere and forming the chamber static pressurizing mode of said vessel, said static pressure responsive outlflow outlet means is connected to piping for conveying the liquids from the well, and the vessel is suspended in the well and held essentially stationary vertically and upright at an elevation within the well wherein both the liquid hydrocarbons and the ground water are received in said vessel chamber in said venting mode of said pump, the liquids are pumped from said chamber substantially free of emulsification in said pressurizing mode.

7. The ejector pump set forth in claim 6 wherein:

said vessel includes a conduit therein defining said vessel outflow port and connecting same with said outlet of said outflow permitting check valve means, said liquid inflow check valve means comprises a pair of oppositely acting flapper members mounted for free swinging movement about a common pivot axis extending crosswise of the direction of said inflow direction between a folded side by side inflow permitting relation in said vented mode of said vessel, and an inflow checking relation in said chamber static pressuriizing mode of said vessel, said liquid outflow check valve means comprises a pair of oppositely acting flapper members mounted for free swinging movement about a common pivot axis extending crosswise of the direction of said outflow direction between a folded side by said outflow permitting relation in said chamber static pressurizing mode of said vessel, and an outflow checking relation in said vented mode of said vessel.

8. An ejector pump comprising:

a rigid, elongated tubular body defining a pump chamber;

liquid outflow conduit means positioned in an opening in one end of said body for conveying liquid from said chamber and comprising check valve means for preventing flow of liquid into said chamber through said conduit means; the input end of said outflow conduit means being positioned in said chamber near the other end of said body and the output end of said outflow conduit means extending outside said body;

said other end of said body having a liquid inflow opening therein;

first liquid check valve means positioned in said liquid inflow opening for preventing flow of liquid out of said chamber through said liquid inflow opening;

liquid inflow conduit means positioned in a second opening in said one end of said body for conveying liquid into said chamber and comprising check valve means for preventing flow of liquid out of said chamber through said inflow conduit means; the input end of said inflow conduit means extending outside said body and the output end of said inflow conduit means being positioned in said chamber near said other end of said body;

other conduit means positioned in a third opening in said body for conveying gases from and to said chamber for selectively venting and pressurizing said chamber; and means for sealing said openings in said one end of said body and the respective conduits passing through said openings.

9. An ejector pump comprising:

a rigid, elongated, tubular body defining a pump chamber;

said tubular body having an upper end and a lower end, liquid outflow conduit means positioned in an opening in said upper end of said body for conveying liquid from said chamber and comprising check valve means for preventing flow of liquid into said chamber through said conduit means; the input end of said outflow conduit means being positioned in said chamber near said lower end of said body and the output end of said outflow conduit means extending outside said body;

liquid inflow conduit means posiitoned in a second opening in said upper end of said body for conveying liquid into said chamber and comprising check valve means for preventing flow of liquid out of said chamber through said inflow conduit means; and other conduit means postioned in a third opening in said upper end of said body for conveying gases from and to said chamber for selectively venting and pressurizing said chamber.

* * * * *